United States Patent
Felt

(10) Patent No.: US 7,372,464 B2
(45) Date of Patent: May 13, 2008

(54) PROCESSING IMAGE DATA

(75) Inventor: Adam C. Felt, Reno, NV (US)

(73) Assignee: Autodesk, Inc., San Rafael, CA (US)

( * ) Notice: Subject to any disclaimer, the term of this patent is extended or adjusted under 35 U.S.C. 154(b) by 604 days.

(21) Appl. No.: 10/894,772

(22) Filed: Jul. 20, 2004

(65) Prior Publication Data
US 2005/0041029 A1 Feb. 24, 2005

Related U.S. Application Data

(60) Provisional application No. 60/488,831, filed on Jul. 21, 2003.

(51) Int. Cl.
G06T 15/00 (2006.01)
(52) U.S. Cl. .................. 345/473; 345/474; 707/102
(58) Field of Classification Search .............. 345/473, 345/474, 475; 707/102, 104
See application file for complete search history.

(56) References Cited

U.S. PATENT DOCUMENTS 5,692,117 A 11/1997 Berend et al. ............. 345/475
5,999,194 A * 12/1999 Brunelle .................... 345/473
6,119,123 A * 9/2000 Elenbaas et al. ........... 707/102
6,768,489 B2 * 7/2004 Jeong et al. ............... 345/474

FOREIGN PATENT DOCUMENTS

EP 0 811 954 * 10/1997

* cited by examiner

Primary Examiner—Phu K. Nguyen
(74) Attorney, Agent, or Firm—Patterson & Sheridan LLP

(57) ABSTRACT

A method of processing image data, in which object data is associated with animation data. The animation data has a plurality of keyframes, and each keyframe has a time value, an animation value and two handles. Adjacent keyframes are interpolated to produce a curve that does not overshoot animation values of either of the adjacent keyframes ensuring a smooth transition between the adjacent keyframes. When the position of a selected keyframe is changed in response to an input command, a slope and a magnitude corresponding to each handle of the selected keyframe are recalculated. Furthermore, a slope and a magnitude corresponding to each handle of a keyframe immediately before and a keyframe immediately after the selected keyframe are recalculated.

17 Claims, 31 Drawing Sheets

| KEY ID 702 | TIME VALUE 703 | ANIMATION VALUE 704 | IN HANDLE SLOPE 705 | IN HANDLE MAGNITUDE 706 | OUT HANDLE SLOPE 707 | OUT HANDLE MAGNITUDE 708 | STATE 709 |
|---|---|---|---|---|---|---|---|
| 0000 | 0 | 42 | - | - | 0.00 | 6 | AUTO |
| 0001 | 17 | 39 | 0.47 | 6 | -0.47 | 10.7 | AUTO |
| 0002 | 50 | 9 | 0.00 | 10.7 | 0.00 | 5.3 | AUTO |
| 0003 | 66 | 30 | -1.62 | 5.3 | 1.62 | 3.3 | AUTO |
| 0004 | 76 | 51 | 0.00 | 3.3 | 0.00 | 5.3 | AUTO |
| 0005 | 92 | 10 | 0.00 | 5.3 | 0.00 | 12.3 | AUTO |
| 0006 | 129 | 12 | -0.05 | 12.3 | 0.05 | 6.7 | AUTO |
| 0007 | 149 | 20 | 0.00 | 6.7 | - | - | AUTO |

PROCESSING IMAGE DATA

CROSS-REFERENCE TO RELATED APPLICATIONS

This application claims benefit of U.S. provisional patent application Ser. No. 60/488,831, filed Jul. 21, 2003, which is herein incorporated by reference.

BACKGROUND OF THE INVENTION

1. Field of the Invention

Embodiments of the present invention generally relate to processing image data to change keyframe values.

2. Description of the Related Art

Image data processing systems may receive program instructions for character animation, in which character data (describing the nature of a character) is associated with animation data, specifying character movements. The animation data may consist of a plurality of keyframes and a user may change the values of these keyframes by changing the position of displayed keyframe indicators. However, the movement of one keyframe may impact upon the position of other keyframes, thereby introducing time-based artefacts.

SUMMARY OF THE INVENTION

The present invention processes image data, in which object data is associated with animation data. The animation data has a plurality of keyframes, and each keyframe has a time value and an animation value. Weights are assigned to assignee keyframes dependent on the distance in time between the assignee keyframes and a selected keyframe. When an animation value and/or time value of the selected keyframe is changed, the corresponding value of each assignee keyframe is changed based on the weight assigned to the assignee keyframe. The weights may also be based on user-defined parameters.

Various embodiments of the invention include a computer readable medium storing instructions for causing a computer to process image data and produce a modified keyframe value including the steps of selecting a keyframe from animation data including keyframes to produce a selected keyframe, assigning a weight to an assignee keyframe included in the animation data, the weight dependent on a distance measured in time between the selected keyframe and the assignee keyframe, receiving input data indicating a change in a time value of the selected keyframe, and modifying a time value of the assignee keyframe by an amount based on the change in the time value of the selected keyframe and the weight assigned to the assignee keyframe.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 shows a track table, according to one embodiment of the present invention;

DETAILED DESCRIPTION

Figure 1:
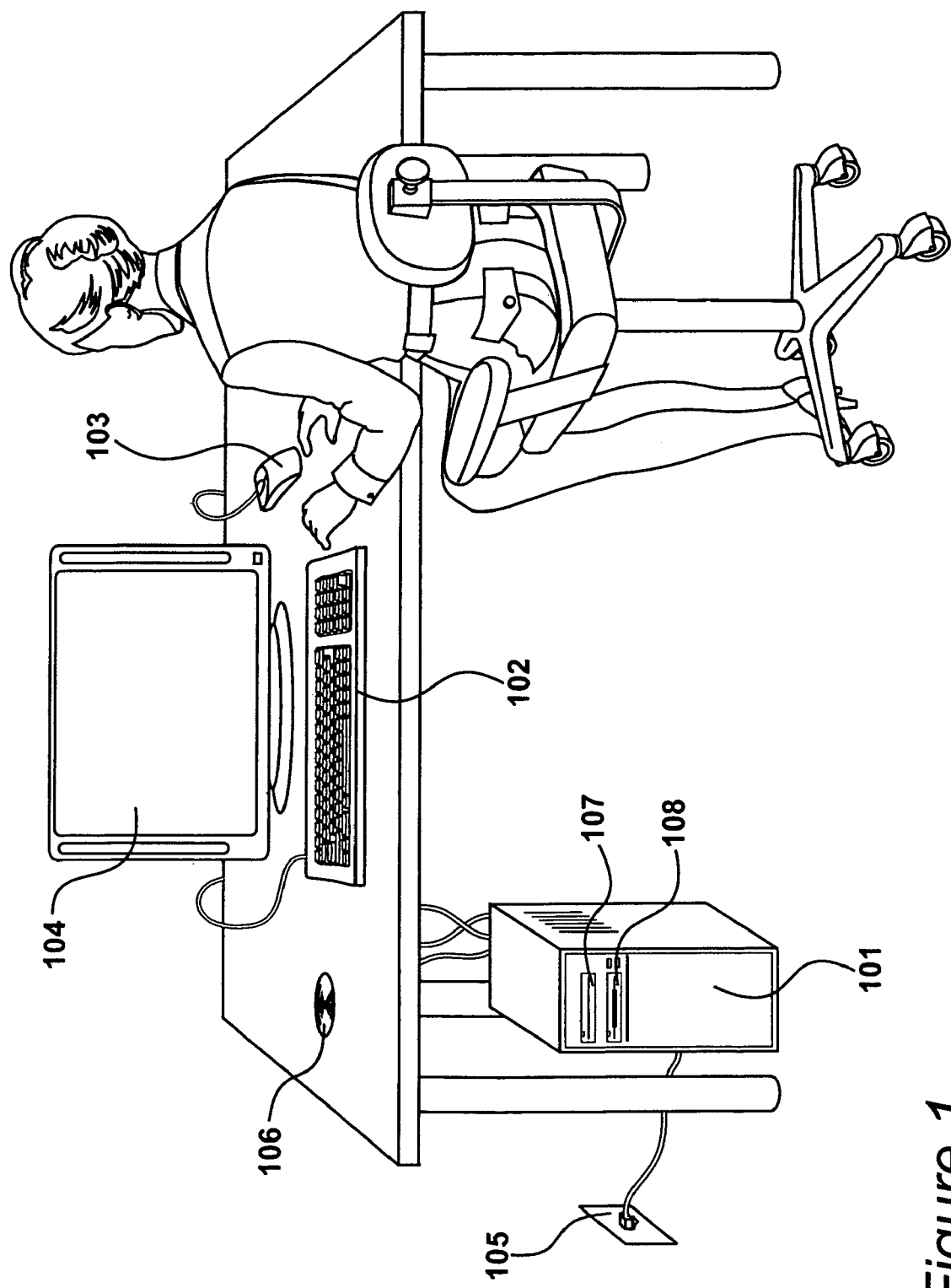
FIG. 1 shows an environment for processing three dimensional image data, according to one embodiment of the present invention.

FIG. 1 shows a system for processing image data, including a video display unit, according to one embodiment of the present invention. Data processing is effected by a programmable computer system 101 that responds to input data from a user via a keyboard 102, and a mouse 103, or similar manually operable input devices. Output data from computer system 101 is displayed to the user via a visual display unit 104. A network connection 105 allows the computer system 101 to communicate with a local server and also facilitates communication externally via the internet.

Computer system 101 receives input data from the keyboard 102 and other input devices via cable connections although in alternative embodiments radio interfaces could be provided. Many different types of programmable computer system 101 could be deployed and in alternative embodiments the functionality could be provided using dedicated hardware.

Instructions executable by computer system 101 are installed via an instruction carrying medium such as a CD-ROM 106 or a similar instruction carrying medium such as a DVD etc. The computer system 101 may also have devices for recording output data, such as CD-ROM burners or DVD burner 107 or removable magnetic disk storage device 108, for example.

Figure 2:
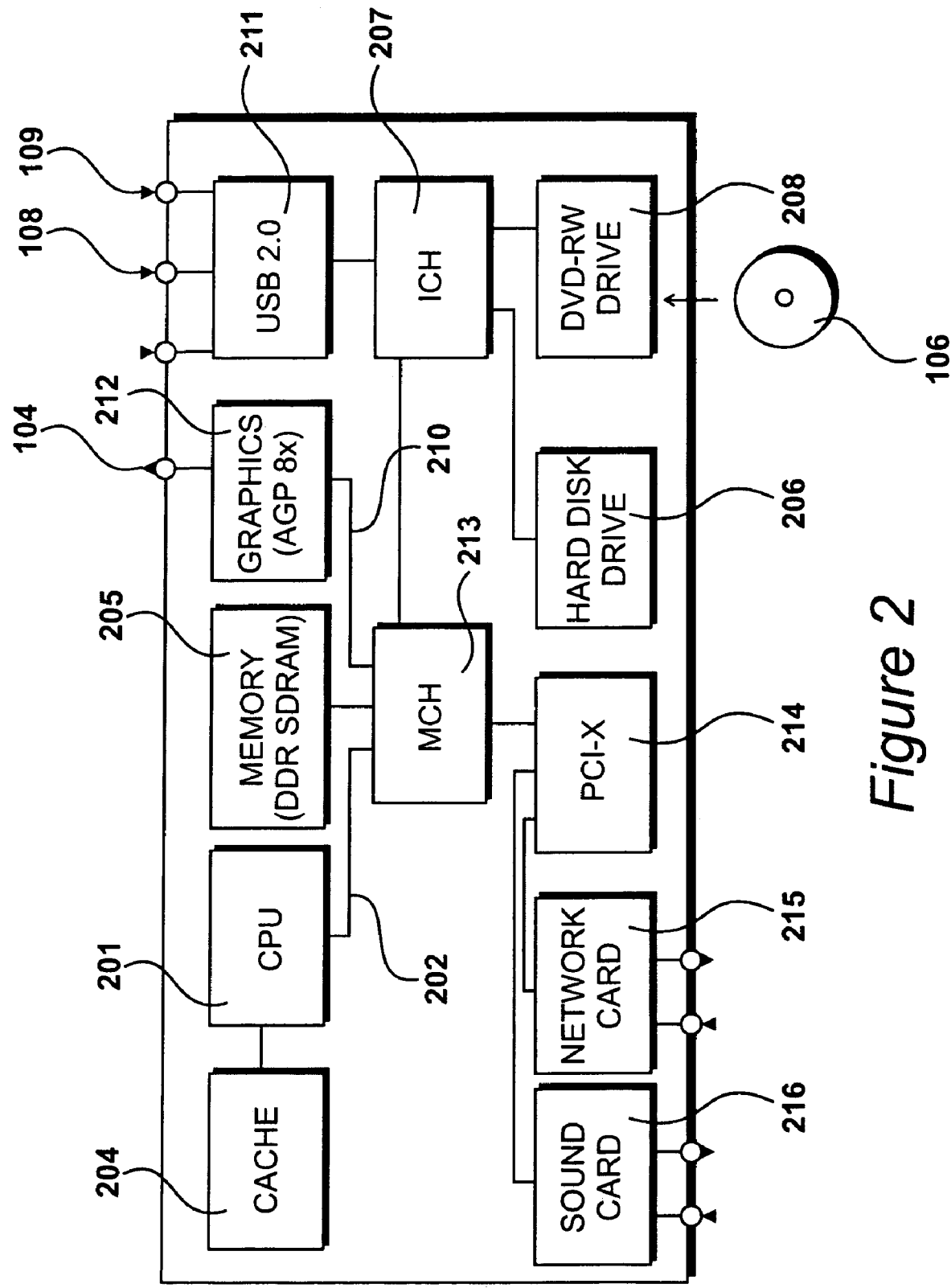
FIG. 2 details components of the computer system shown in FIG. 1, according to one embodiment of the present invention.

FIG. 2 is a block diagram including the components of computer system 101, according to one embodiment of the present invention. In some embodiments of the present invention, the components are based upon the Intel® E7505 hub-based Chipset. It will be readily understood by those skilled in the art that the configuration described hereinafter is for the purpose of illustration only and not limitative.

The system includes an Intel® Pentium™ Xeon™ DP central processing unit (CPU) 201 running at three Gigahertz (3 GHz), which fetches instructions for execution and manipulates data via an Intel® E7505 533-Megahertz system bus 202 providing connectivity with a Memory Controller Hub (MCH) 203. The CPU 201 has a secondary cache 204 comprising five hundred and twelve kilobytes of high speed static RAM, for storing frequently-accessed instructions and data to reduce fetching operations from a larger main memory 205 via the memory controller hub 203. The memory controller hub 203 thus co-ordinates data and instruction flow with the main memory 205, which is at least one gigabyte in storage capacity, in this embodiment of present invention. Instructions and data are thus stored in the main memory 205 and the cache 204 for swift access by the CPU 201.

A hard disk drive 206 provides non-volatile bulk storage of instructions and data via an Input/Output Controller Hub (ICH) 207. The controller hub 207 also provides connectivity to storage devices 108 and 109, as shown in FIG. 1. USB 2.0 interface 211 also provides connectivity to manually operable input devices, such as 102, 103 and 104.

A graphics card 212 receives graphic data and instructions from the CPU 201. The graphics card 212 is connected to the memory controller hub 203 by means of a high speed AGP graphics bus 213. A PCI interface 214 provides connections to a network card 215 that provides access to the network connection 106, over which instructions and or data may be transferred. A sound card 216 is also connected to the PCI interface 214 and receives sound data or instructions from the CPU 201.

The equipment shown in FIG. 2 constitutes the components of a high-end IBM™ PC compatible processing system. In an alternative embodiment of the present invention, similar functionality is achieved using an Apple™ PowerPC™ architecture-based processing system.

Figure 3:
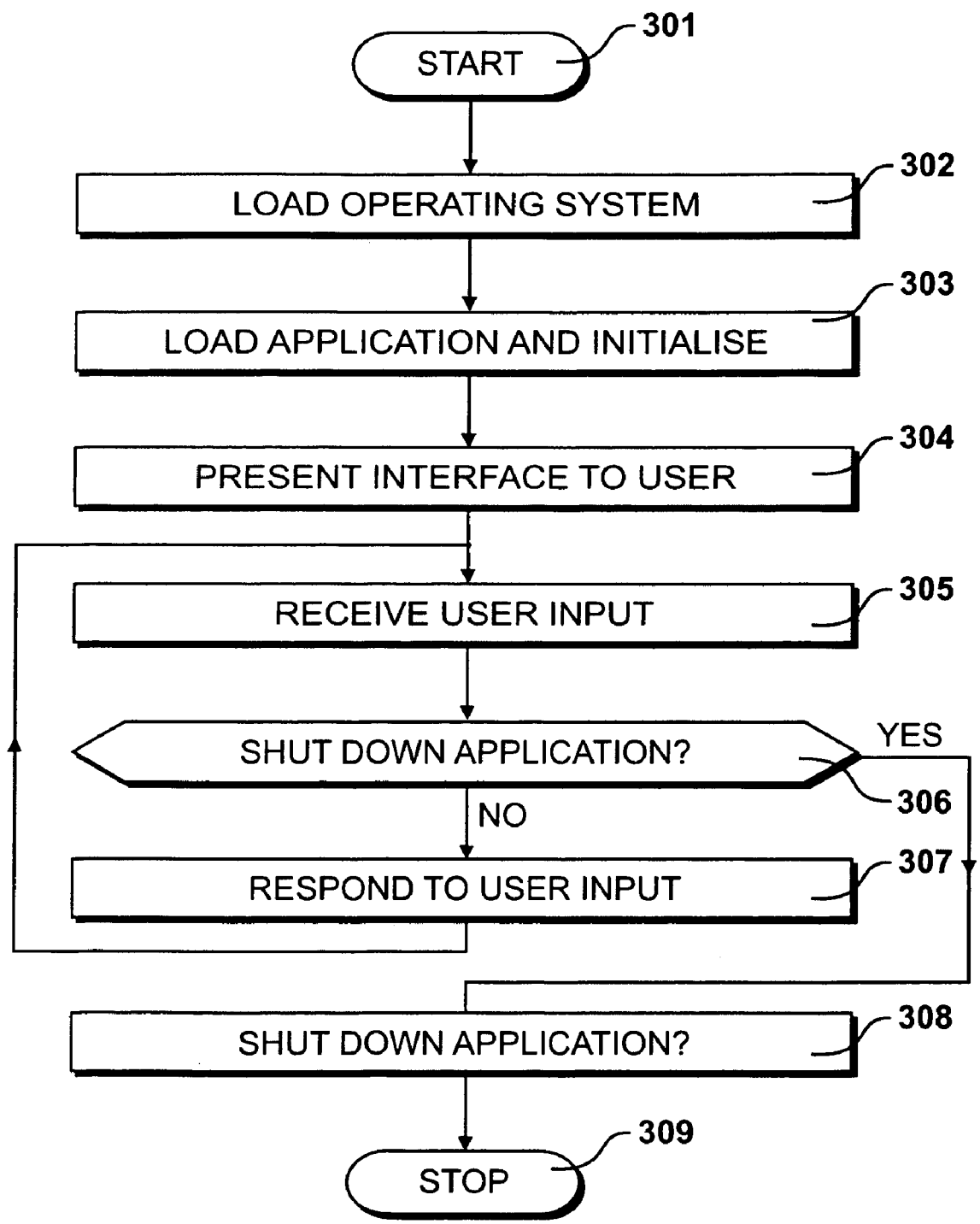
FIG. 3 illustrates operations performed by the system shown in FIG. 2, according to one embodiment of the present invention.

FIG. 3 illustrates operations performed by the system shown in FIG. 2, according to one embodiment of the present invention. After starting operation at step 301, instructions defining an operating system are loaded at step 302. In one embodiment of the present invention, the operating system is Microsoft™ Windows™ but in alternative embodiments of the present invention, other operating systems may be used such as MacX™ or Linux, for example.

At step 303 instructions for the application of an embodiment of the present invention are loaded and initialised resulting in a user interface being displayed at step. 304.

At step 305 a user input command is received either in response to operation of keyboard 102 or in response to operation of the mouse 104.

At step 306 a question is asked as to whether a shutdown command has been received and if this is answered in the affirmative the application is shut down at step 308 and the procedure is stopped 309. Alternatively, if the question asked at step 306 is answered in the negative, the application responds to the user input (received at step 305) at step 307. Thereafter, further input commands are received at step 305 and further responses are made at step 307 until a shutdown command is received and the question asked at step 306 is answered in the affirmative.

Figure 4:
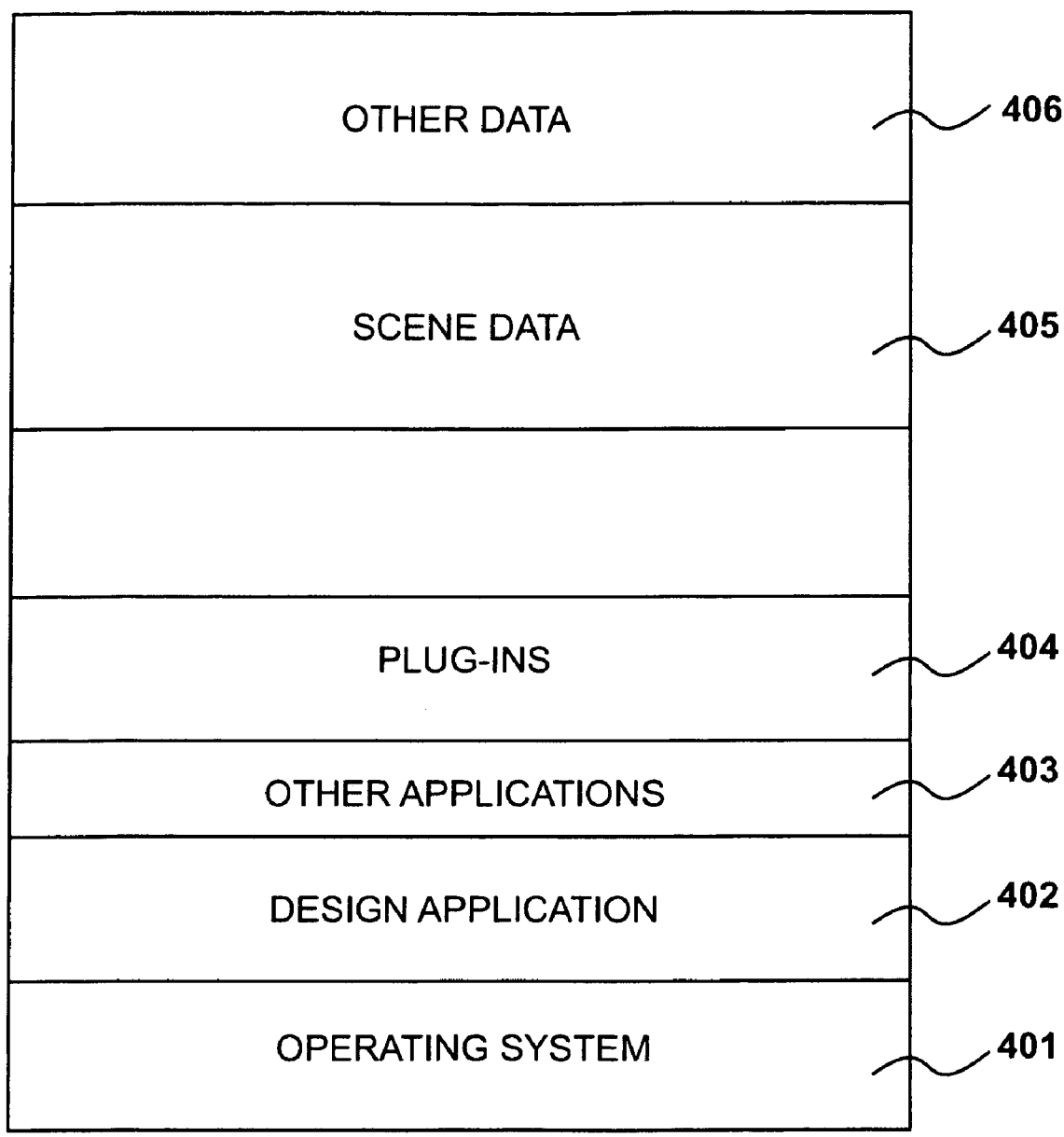
FIG. 4 illustrates an arrangement of program instructions and data in main memory, according to one embodiment of the present invention.

FIG. 4 shows the main memory 205 of FIG. 2, according to one embodiment of the present invention. An operating system 401 provides operating system instructions for common system tasks and device abstraction. The Windows™ XP™ operating system is used. Alternatively, a Macintosh™, Unix™ or Linux™ operating system provides similar functionality. Design application instructions 402 provide instructions for the editing, creation and rendering of three-dimensional object data. Other applications 403 provide common utilities such as internet access, FTP access and email. Plug-ins 404 provide additional instructions for special effects used by the design application 402 when performing rendering.

Scene data, or image data, 405 includes data structures for the storage, animation and configuration of objects that are rendered, edited and modified by the design application instructions 402. Other data 406 includes temporary data structures used by the operating system 401 and other applications 403.

Figure 5:
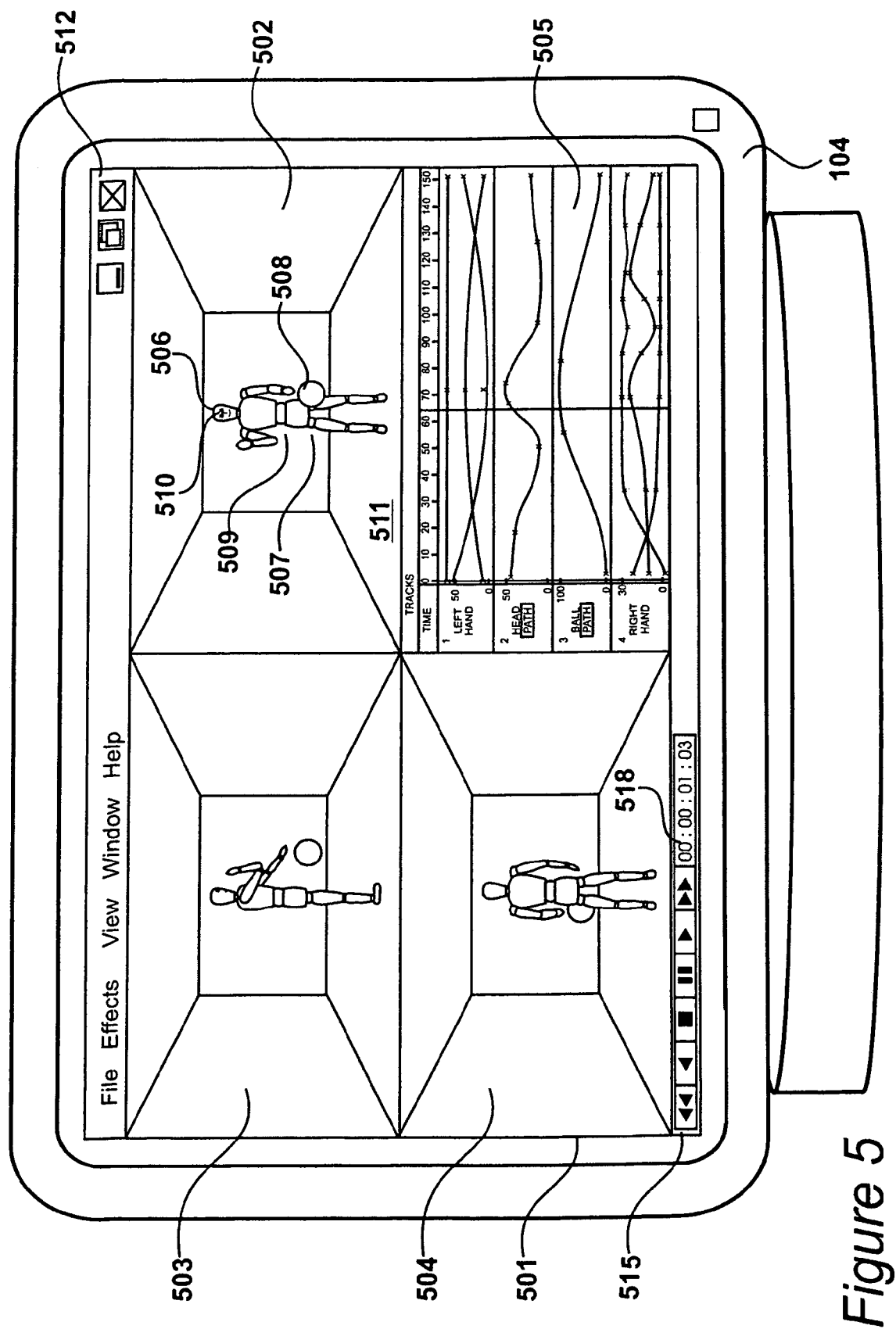
FIG. 5 illustrates a user interface, according to one embodiment of the present invention.

FIG. 5 illustrates a user interface 501, according to one embodiment of the present invention. User interface 501 is presented to the user of processing system 101 on VDU 104 after the user has loaded scene data comprising object data and animation data. The interface comprises a first scene window 502 showing the scene from the front, a second scene window 503 showing the scene from the right-hand side, a third scene window 504 showing the scene from behind and a curve window 505 that contains curves in animation tracks. Curve window 505 is just one of the various toolboxes available to the user, and others may be accessed using keyboard shortcuts or menu bar 512.

As shown in FIG. 5, the scene 511 currently comprises a character 506 and a ball 507. These are defined by the loaded object data. The animation of this scene comprises character 506 bouncing the ball 507 with his left hand 508 whilst waving with his right hand 509 and moving his head 510.

Thus four objects in the scene are controlled by the animation data shown in curve window 505.

User interface 501 further comprises navigation buttons 515, that allow a user to progress forwards or backwards through the animation. Time display 518 shows the current time of the animation in hours, minutes, seconds and frames. The display rate in this example is sixty frames per second.

Figure 6:
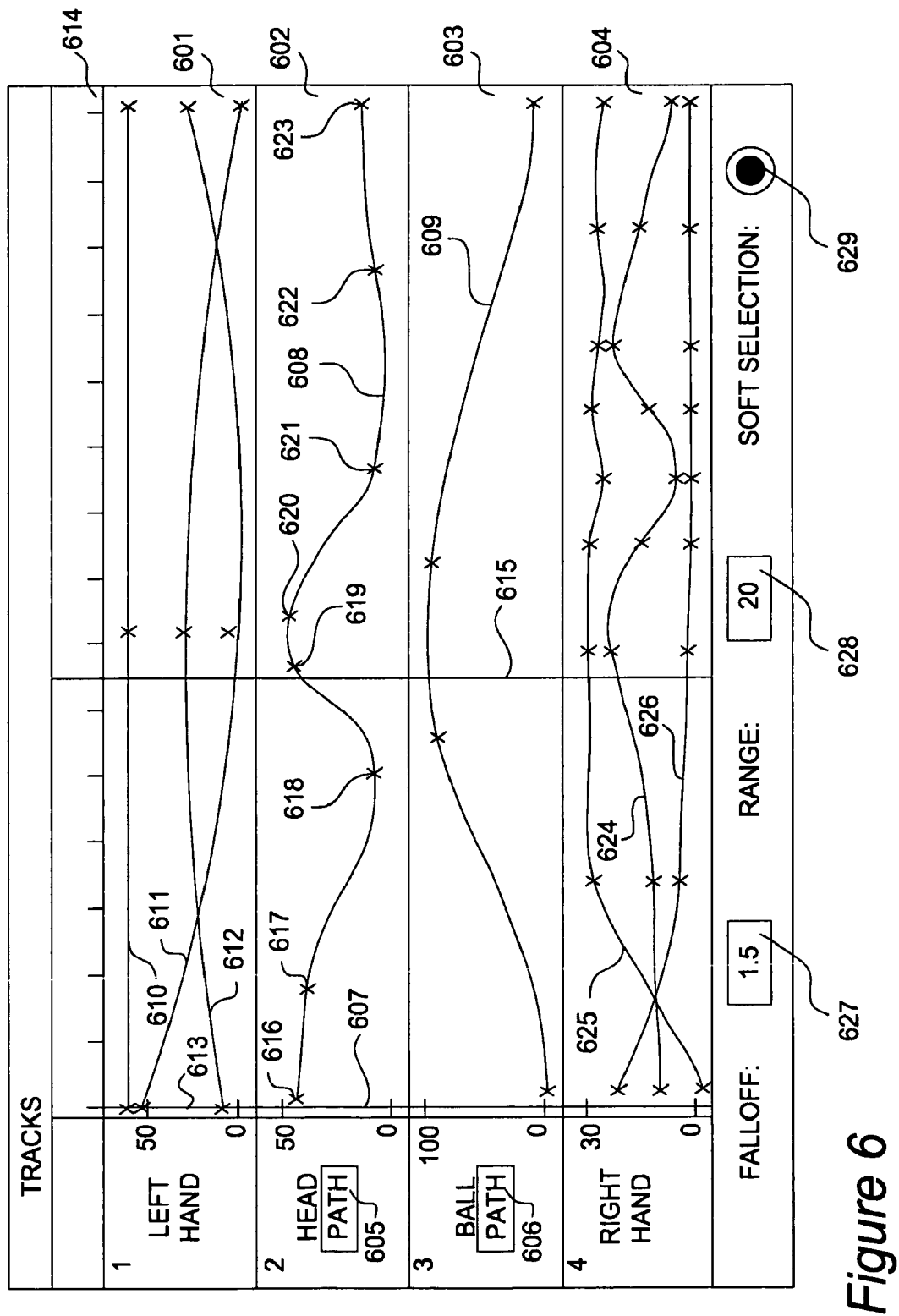
FIG. 6 shows a curve window, according to one embodiment of the present invention.

FIG. 6 shows curve window 505, according to one embodiment of the present invention. As described with reference to FIG. 5, four objects in the scene are animated. Track 601 contains animation data for left hand 508, track 602 contains animation data for head 510, track 603 contains animation data for ball 507 and track 604 contains animation data for right hand 509. Each track plots animation values against time. Thus the image data for each object in the scene, whether it is a head, hand or ball, is associated with animation data.

Head 510 and ball 507 move along predetermined motion paths, which can be viewed or changed by the user by pressing buttons 605 and 606 respectively. For example, the motion path of head 510 defines a side-to-side movement. Animation values are given as a percentage of the animation path, as shown by axis 607. The entire path turns the character's head from right to left, and so if the animation value is at zero percent then the head is turned all the way to the right and if it is one hundred percent then it is turned all the way to the left. An animation value of fifty percent means the character is looking straight ahead. Curve 608 in track 602 thus represents the animation data of time values, animation values and a motion path that together cause character 506 to move his head from the centre to the right, quickly back to the centre and then slowly back to the right.

Ball 507's motion path is an up-and-down bouncing movement, wherein an animation value of zero percent puts the ball on the floor and an animation value of one hundred percent means it is at a predetermined height above the ground, in this example at a convenient height for character 506's hand. Thus curve 609 in track 603 represents the animation data of time values, animation values and a motion path that cause the ball to bounce up and down once.

Track 601 shows movement of character 506's left hand 508, which bounces ball 507. Left hand 508 does not follow a predetermined path and its animation data is defined purely in terms of x, y and z co-ordinates within scene 511. Curve 610 gives the x-movement, which is side-to-side as viewed in scene window 502, curve 611 gives y-movement, which is up-and-down as viewed in scene window 502, and curve 612 gives z-movement, which is straight out of scene window 502, or side-to-side in scene window 503. Thus the animation values on axis 613 are not percentages but distances from the centre of scene 511. Track 604 defining movement for right hand 509 also shows x, y and z curves 624, 625 and 626 respectively.

Each of the curves is plotted against time in frames, as shown by timeline 614. Marker 615 indicates the current time, such that scene. 511 is currently at the state indicated by each of the curves at the time shown by marker 615. Therefore left hand 508 is about to bounce the ball, which is almost at the top of its motion path, head 510 is looking nearly straight forward and right hand 509 is lifted and about to start waving. Movement of the character's arms is defined either by inverse kinematics or by a motion path that is dependent upon the position of the hand, and is determined by the movement of the hands. Marker 615 can be moved by the user, preferably using mouse 103, to produce the same effect as using navigation buttons 507.

The animation data represented by each of the curves in each of the tracks is defined by keyframes. The keyframes in track 602 are shown by indicators 616, 617, 618, 619, 620, 621 and 622. These are set by the user or by pre-defined animation data such as motion capture or saved animations. At each keyframe the time value and animation value of the animation is defined. Values between the keyframes are then interpolated to produce smooth movement. This is called in-betweening. The terminology derives from the days of hand animation, when a head animator would draw the important or "key" frames and assistants would draw the "in-between frames".

In some embodiments of the present invention, the interpolation is produced by defining a Bezier curve between each pair of adjacent keyframes. Each keyframe has an "in handle" and an "outhandle" (not shown), which are lines drawn between the keyframe and two control points. Each handle has a slope and a magnitude and these determine the shape of the Bezier curve.

For tracks with three curves, such as track 601, then whenever there is a keyframe for one of the dimensions of movement there must be a keyframe for the other two at the same time. Thus each of the keyframes can be moved independently in animation value but if one of the indicators is moved in time then the corresponding indicators on the other two curves are also moved. This is controlled by a point3 controller, which will be described further with reference to FIG. 7.

In addition, curve window 505 contains a falloff parameter 627, a range parameter 628 and a radio button 629 to turn "soft selection" on or off. If soft selection is turned on, when the user indicates a keyframe indicator, using a cursor controlled by mouse 103, and moves that indicator, neighbouring keyframes in the curve are also moved by a lesser amount. This amount is determined by a weight. Each keyframe in the curve is assigned a weight and this is controlled by falloff parameter 627 and range parameter 628. Range parameter 628 defines a range of time values before and after the indicated keyframe indicator and keyframes outside that range have a weight of zero and are therefore not affected. Keyframes inside the range are assigned a weight dependent upon how close in time they are to the indicated keyframe and also dependent upon the falloff parameter 627. This defines the distribution of the weights over the range.

This is particularly useful when dealing with motion capture data. Typical motion capture data comprises a track of point3 controllers, usually with a keyframe at every frame. Adjusting this type of animation data is difficult since usually if one keyframe is moved the keyframes around it should also be moved. However, they cannot simply be moved all by the same amount as this would move them all too far away from their neighbours.

FIG. 7 shows track table 701 that contains the values defining the keyframes in track 602, according to one embodiment of the present invention. Column 702 contains a key ID. These IDs are always sequential, such that if a keyframe is added or deleted the keys are renumbered in order according to their time values, which are given in column 703. Animation values are given in column 705, while the state of the keyframes is given in column 709. This indicates "AUTO" for all the keyframes in track 602, showing that all the keyframes have their handles automatically adjusted by the "autotangent" system. However, if the user had altered the handles of a keyframe it would show a different state indicating, for example, that the handles are symmetrical in slope and in magnitude, or that the handles have been broken, allowing differing slopes.

Columns 705 and 706 give the slope and magnitude respectively of the in handles of each keyframe while columns 707 and 708 give the slope and magnitude respectively of the out handles. The first and last keys do not have in and out handles respectively, since they are only interpolated by a single Bezier curve.

Track 603 has a track table with the same columns containing the definitions of the keyframes in track 603. The tables for tracks 601 and 604 are similar but each row defines a controller which contains three keys. Therefore each row has no key ID but a single controller ID and a single time value. The other columns appear three times each, so that there are three animation values, three in-tangent handle slopes and magnitudes, three out-tangent handle slopes and magnitudes, and three handle states. The controller IDs are sequentially numbered in the same way as the key IDs in table 701. Throughout the rest of this description single keys and point3 controllers will be discussed together, since the animation values of the curves defined by point3 controllers are independent, even though their time values are bound together.

Figure 8:
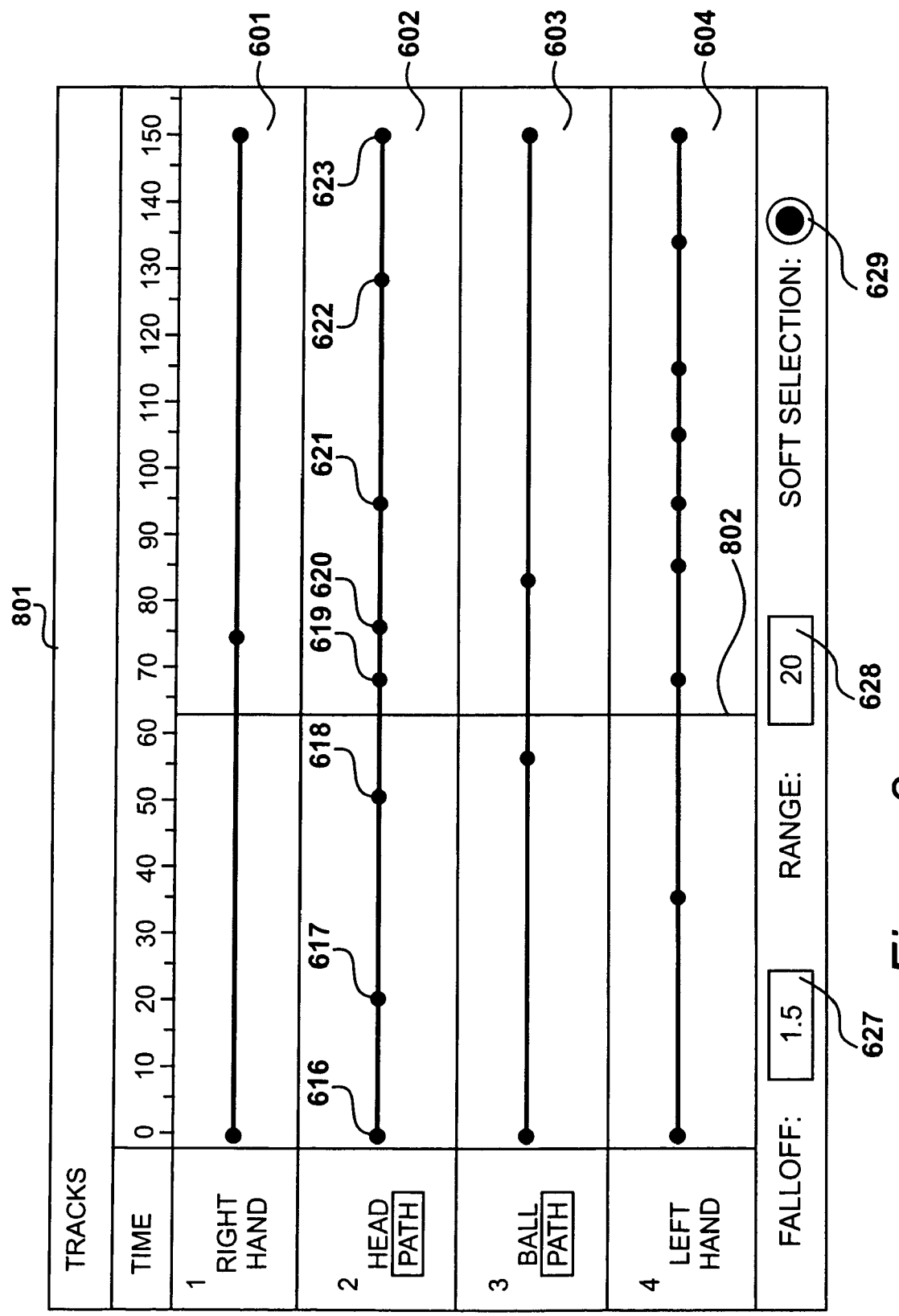
FIG. 8 shows a track window, according to one embodiment of the present invention.

FIG. 8 shows a track window 801, according to one embodiment of the present invention. This can be displayed in preference to curve window 505. The tracks in track window 801 show the time at which each of the keyframes occurs but does not display the animation values, although they can be accessed via a flyout for each keyframe. This window is useful when a user does not wish to alter the animation values of an animation curve but wishes to move some or many keyframes in time. This window allows many more tracks to be displayed at once than does the curve window 505. Thus, for example, track 602 still contains keyframes 616 to 623 but only their times are displayed and not any other information. Time marker 802 shows the time at which the animation data is evaluated for display in scene windows 502, 503 or 504.

Similar to curve window 505, track window 801 contains falloff parameter 627, range parameter 628 and soft selection radio button 629.

The skilled reader will understand that other ways of displaying the requisite data are possible. The invention provides a method of assigning weights to keyframes dependent upon the distance in time between keyframes and a selected keyframe and also upon user-defined parameters, and moving each keyframe by an amount that is dependent upon its weight and an amount of movement specified by the user.

Figure 9:
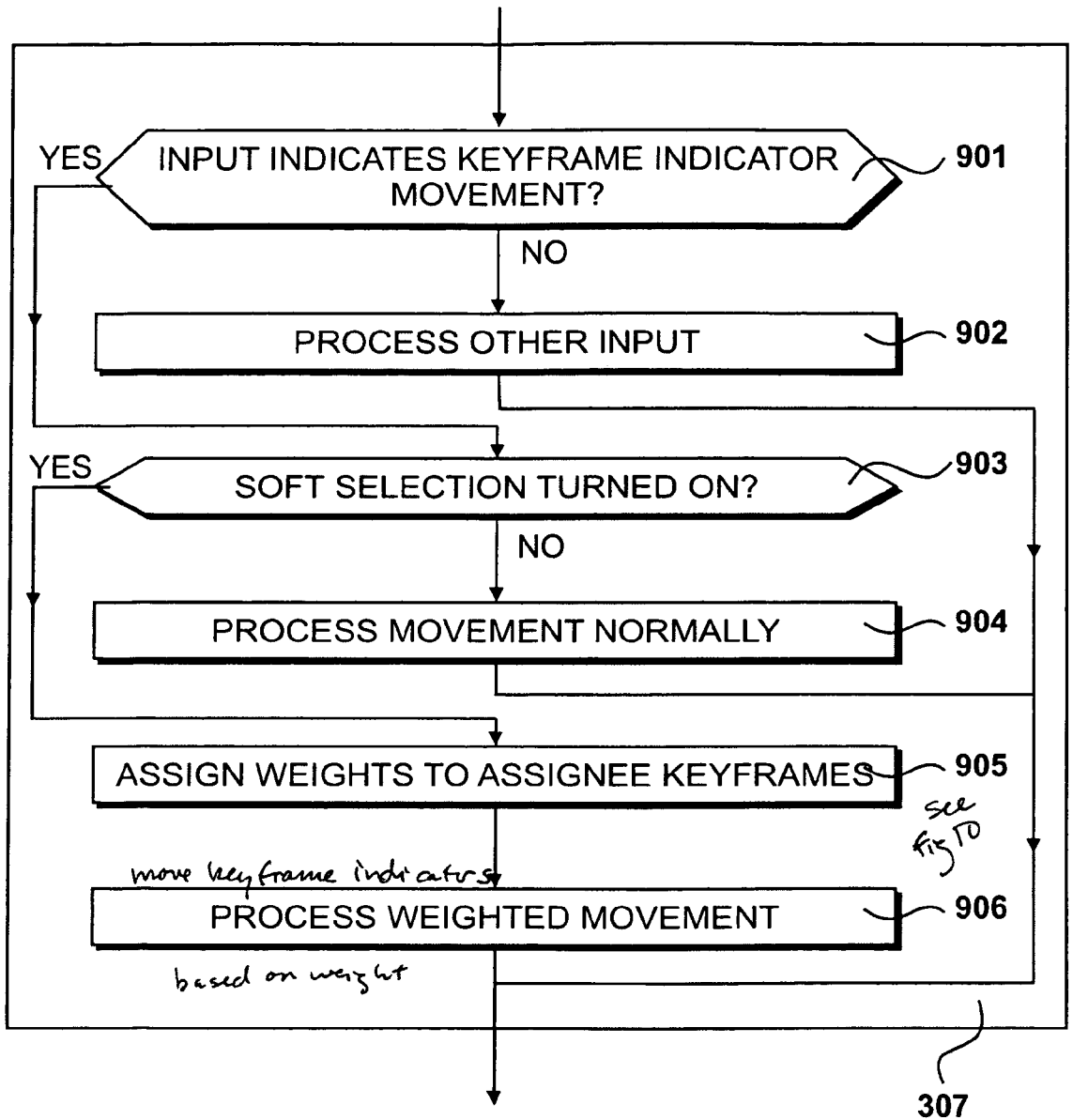
FIG. 9 details steps carried out to respond to user input, according to one embodiment of the present invention.

FIG. 9 details steps carried out at step 307 to respond to user input received at step 305, according to one embodiment of the present invention. At step 901 a question is asked as to whether the input received indicates the specification of one or more keyframe indicators and movement thereof, ie the change of time or animation values of one or more specified keyframes. If this question is answered in the negative then the input received at step 305 is animation input that is not specifically relevant to this invention and so this is processed at step 902.

If the question asked at 901 is answered in the affirmative then at step 903 a further question is asked as to whether soft selection is turned on, as indicated by radio button 629. If this question is answered in the negative then the movement of the specified keyframe indicators is processed in the normal way at step 904.

However, if it is answered in the affirmative then assignee keyframes in the animation have a weight assigned to them at step 905. Keyframes that are closer to a specified keyframe will have a higher weight than those further away. At step 906 the movement indicated by the input is processed by moving the specified keyframe indicators by the amount given by the input and moving the assignee keyframe indicators by a lesser amount that is dependent upon their weights. The input is produced by the user specifying at least one keyframe indicator, pressing down a button on mouse 103 and moving the mouse in the direction in which the keyframe indicators should be moved, triggering movement of a cursor on VDU 104. Further input is received by further movement of the cursor until the user releases the mouse button.

Thus there is provided a method of processing image data, in which object data is associated with animation data, said animation data has a plurality of keyframes, and each keyframe has a time value and an animation value. The method comprises the steps of receiving first user input data specifying a keyframe, assigning a weight to other assignee keyframes dependent upon the distance in time between the assignee keyframe and the selected keyframe, receiving second user input data for said selected keyframe indicating a change in at least one of said values, changing the values of said selected keyframe in response to said input movement data and changing the values of said assignee keyframes by amounts determined by said second user input data and said respective assigned weighting values.

In this embodiment of the present invention, the first and second user input data are received at the same time, but the specification of keyframes and the cursor movement are considered to be separate inputs.

Figure 10:
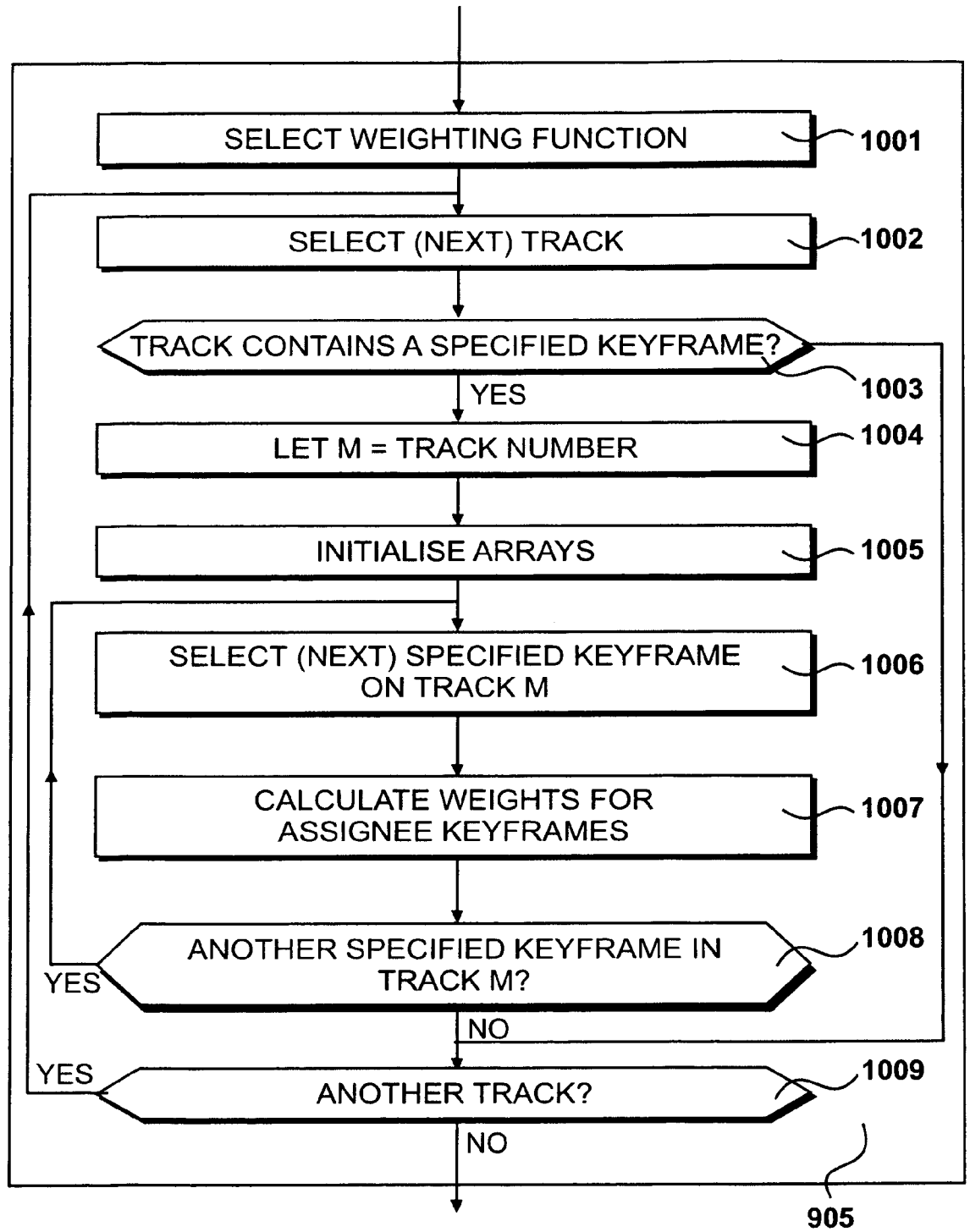
FIG. 10 details steps carried out at which weights are assigned to assignee keyframes, according to one embodiment of the present invention.

FIG. 10 details step 905 at which weights are assigned to assignee keyframes, according to one embodiment of the present invention. An assignee keyframe is one which has a weight assigned to it. In this embodiment of the present invention, all the keyframes in tracks that have keyframes selected by the user are assignee keyframes, but many of them have a weight of zero. However in other embodiments of the present invention, it may be that not all of the keyframes are assignee keyframes.

At step 1001 the necessary weighting function is identified. This is determined by falloff parameter 627 and is described further with reference to FIG. 11. At step 1002 the first track in the animation is selected and at step 1003 a question is asked as to whether the track contains a specified keyframe. If this question is answered in the negative then control is directed to step 1009 at which a question is asked as to whether there is another track in the animation. However, if the question asked at step 1003 is answered in the affirmative then at step 1004 a variable M is set to be the number of the track and at step 1005 two arrays are initialised for use in the processing described further below.

At step 1006 the first specified keyframe is selected and at step 1007 weights are calculated for the assignee keyframes. At step 1008 a question is asked as to whether there is another specified keyframe in track M and if this question is answered in the affirmative then control is returned to step 1006 and that keyframe is selected. If it is answered in the negative then at step 1009 the question is asked as to whether there is another track in the animation. If this question is answered in the affirmative then control is returned to step 1002 and the next track is selected. If it is answered in the negative then step 903 is concluded.

Figure 11:
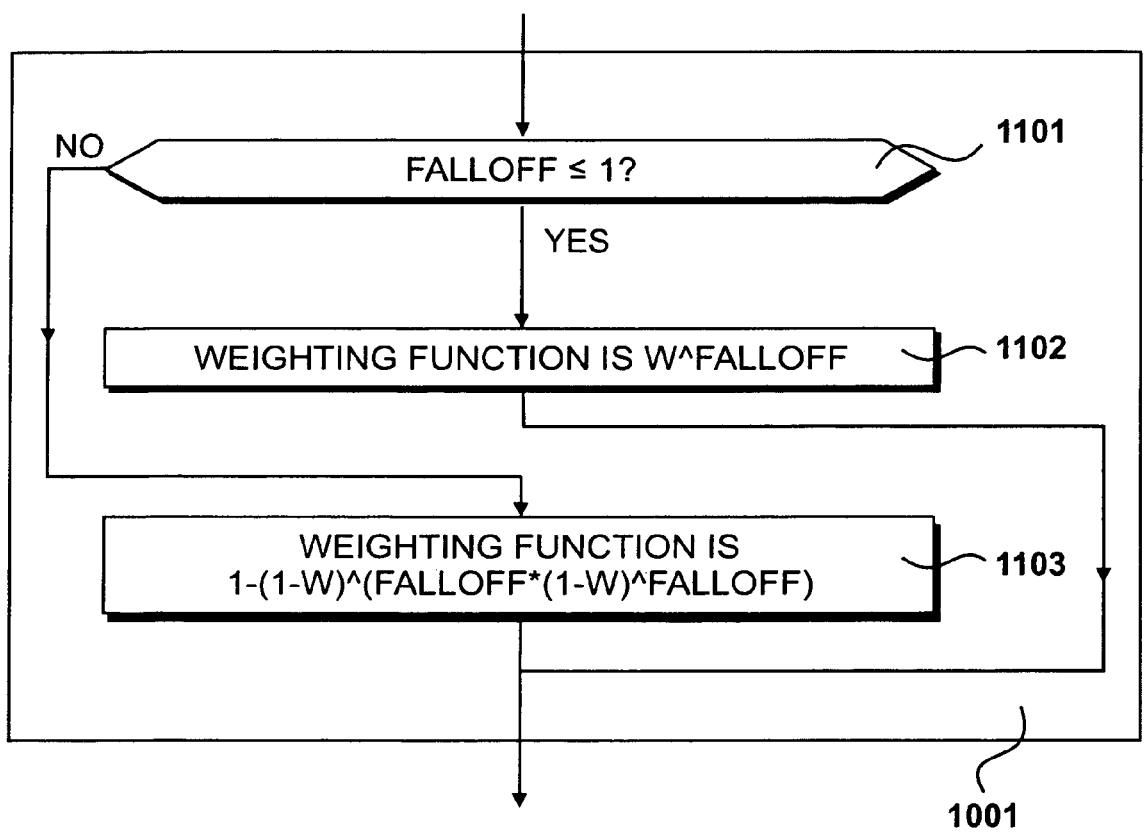
FIG. 11 illustrates the setting of key frames, according to one embodiment of the present invention.

FIG. 11 details step 1001 at which the function to be used for weighting the keyframes is set, according to one embodiment of the present invention. This function is expressed in terms of a variable W which will be discussed further with reference to FIG. 14.

At step 1101 a further question is asked as to whether the falloff parameter 627 is less than or equal to one and if this question is answered in the affirmative then at step 1102 the weighting function is set to be the variable W to the power of falloff parameter 627.

If the question asked at step 1101 is answered in the negative, to the effect that falloff parameter 627 is greater than one, then at step 1103 the weighting function is set to be W subtracted from one all to the power of a certain function, all subtracted from one. The certain function is the product of: falloff parameter 627, and W subtracted from one all to the power of falloff parameter 627 all subtracted from one.

Figure 12:
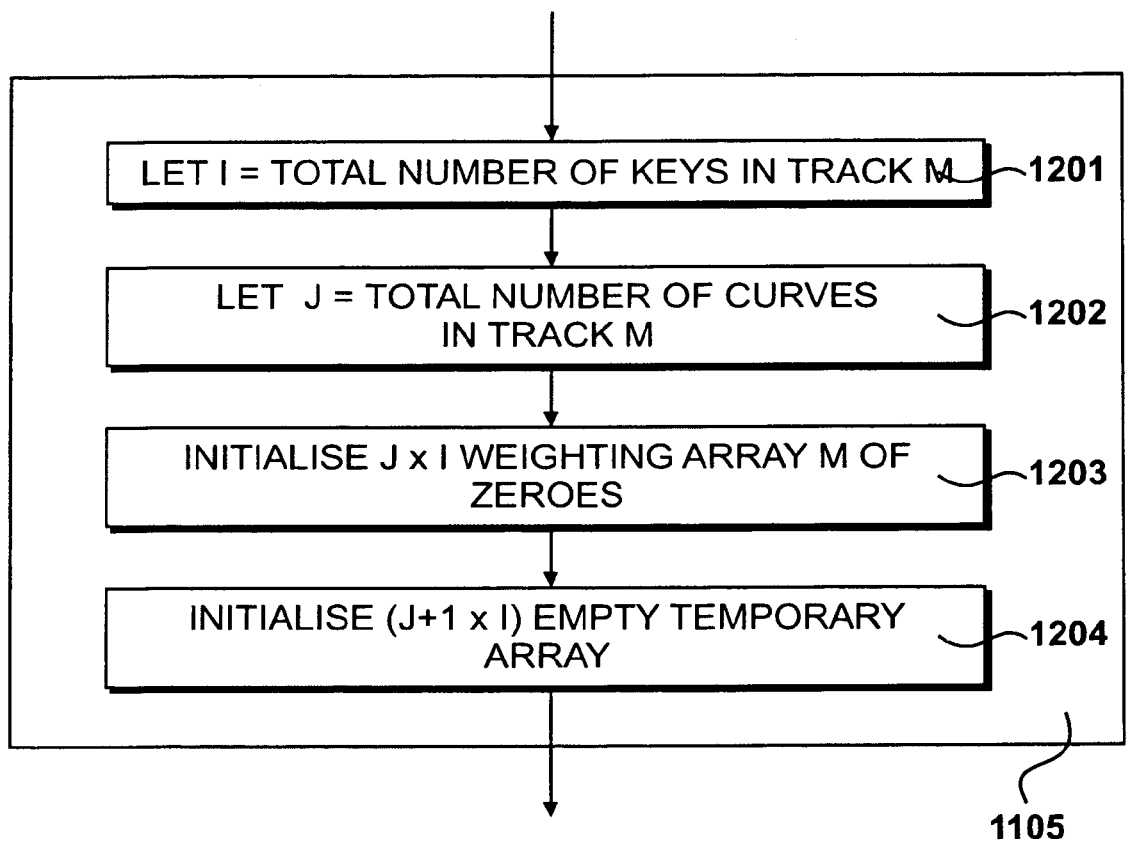
FIG. 12 illustrates the initialising of arrays, according to one embodiment of the present invention.

FIG. 12 details step 1005 at which two arrays are initialised for the selected track, according to one embodiment of the present invention. At step 1201 a variable I is set to be the total number of keys in the selected track and at step 1202 a variable J is set to be the number of curves in the track. Thus, for example, for track 602 I would be eight and J would be one, while for track 601 I and J would both be three.

At step 1203 an array with I rows and J columns is initialised and filled with zeroes. This is referred to as a weighting array and will contain the weights assigned to the assignee keyframes. At step 1204 another array with I rows but (J+1) columns is also initialised but left empty. This is a temporary array and is used to store time and animation values for keyframes to be displayed while the user is still moving the keyframes. These new positions are not entered into the track table until the user releases the mouse button.

Figure 13:
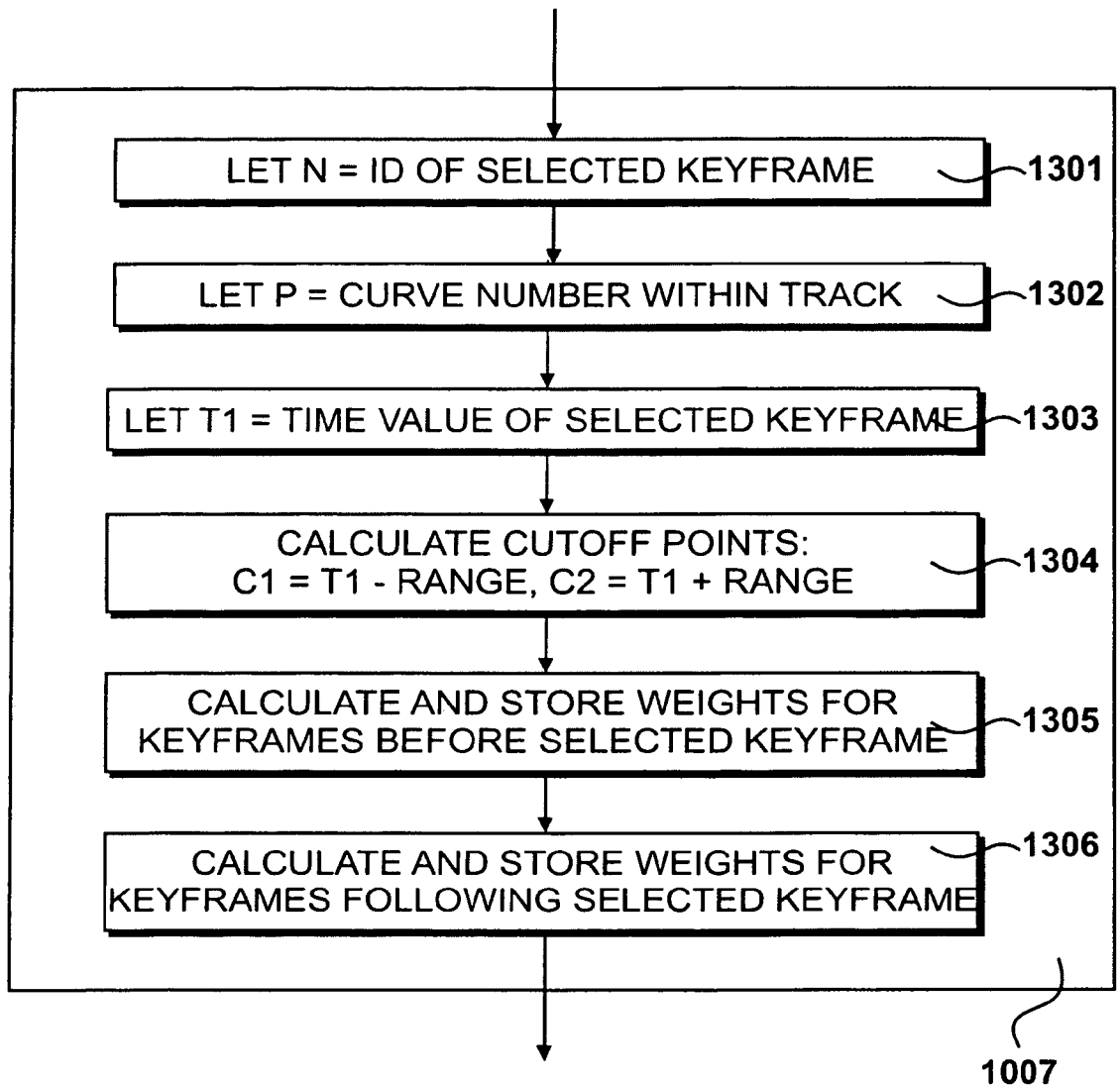
FIG. 13 shows the calculation of weights foe assignee keyframes, according to one embodiment of the present invention.

FIG. 13 details step 1007 at which the weights for the assignee keyframes are calculated, according to one embodiment of the present invention. It will be recalled that the user may indicate more than one keyframe on more than one track for simultaneous movement. These keyframes are selected one by one by the process and weights calculated for their neighbouring keyframes.

Thus at step 1301 a variable N is initialised to be the keyframe ID of the selected keyframe. If the keyframe is controlled by a point3 controller then variable N is instead the controller ID. At step 1302 another variable P is initialised to be the curve number, within its track, of the curve to which the selected keyframe belongs. Thus, for example, if a keyframe in either of tracks 602 or 603 were selected then P would be one since there is only one curve in each track. However, if a keyframe on curve 625, which indicates positional data of right hand 509 within scene 511, were selected then P would be two since curve 625 is considered to be curve number two within track 604.

At step 1303 a weight of one is stored in the entry at row N, column P in the weighting array for the currently selected track, replacing the zero that was there previously. This is the entry corresponding to the selected keyframe which, as a specified keyframe, has a weight of one.

At step 1304 a variable T1 is set to be the time value of the selected keyframe and at step 1305 two cutoff points are selected based on this variable and the range parameter 628 specified by the user. Thus a first cutoff point C1 is defined as range parameter 628 subtracted from variable T1, while a second cutoff point C2 is defined as the sum of variable T1 and range parameter 628.

At step 1306 weights are calculated and stored for keys that have a time value smaller than T1, i.e., those that precede the selected keyframe, and at step 1307 weights are calculated and stored for keyframes that have a time value greater than T1, ie those that follow the selected keyframe.

Figure 14:
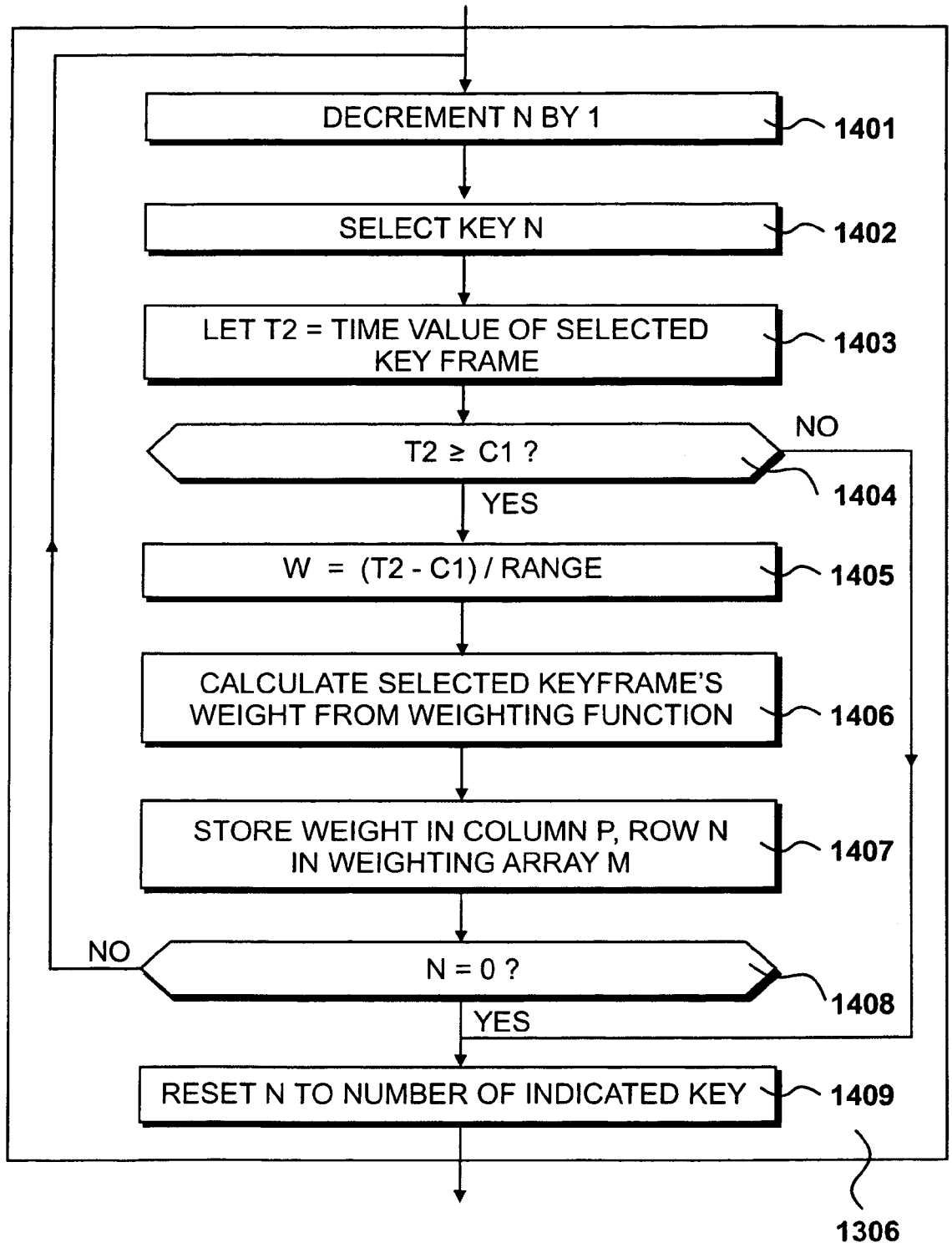
FIG. 14 shows the calculation of weights for keyframes that precede the selected keyframe, according to one embodiment of the present invention.

FIG. 14 details step 1306 at which weights are calculated for keyframes that precede the selected keyframe, according to one embodiment of the present invention. At step 1401 the variable N is decremented by one and at step 1402 the keyframe with an ID equal to the new value of N is identified. In other words, the keyframe immediately preceding the selected keyframe is identified. At step 1403 a variable T2 is set to be the time value of this identified keyframe and at step 1404 a question is asked as to whether this time value is greater than or equal to the cutoff point C1. If this question is answered in the negative then the identified keyframe does not fall within the range specified by range parameter 628. This means that all of the keys preceding the identified keyframe also fall outside the range and thus step 1306 is concluded after the variable N is reset to the number of the keyframe selected at step 1006.

If however the question asked at step 1404 is answered in the affirmative then the identified keyframe does fall within the range and so a value for variable W is calculated for this keyframe at step 1405. W is defined as the cutoff point C1 subtracted from variable T2, all divided by range parameter 628. Thus the value of the variable W is the distance between the lower cutoff point C1 and the time value of the identified key, normalised such that a keyframe at the cutoff point would have a W value of zero while the selected keyframe, which has a time value of T1, has a value for W of one.

At step 1406 the identified keyframe's value for W is input into the weighting function identified at step 1001 in order to give its actual weight and at step 1407 this weight is stored in the weighting array for the track at row N, column P.

At step 1408 a question is asked as to whether the current value of variable N is zero. If this question is answered in the negative then control is returned to step 1401 and N is decremented by one. If the question is answered in the affirmative then there are no keys before the one currently identified so at step 1409 the variable N is reset to the keyframe ID of the keyframe selected at step 1006. Step 1306 is then concluded.

Figure 15:
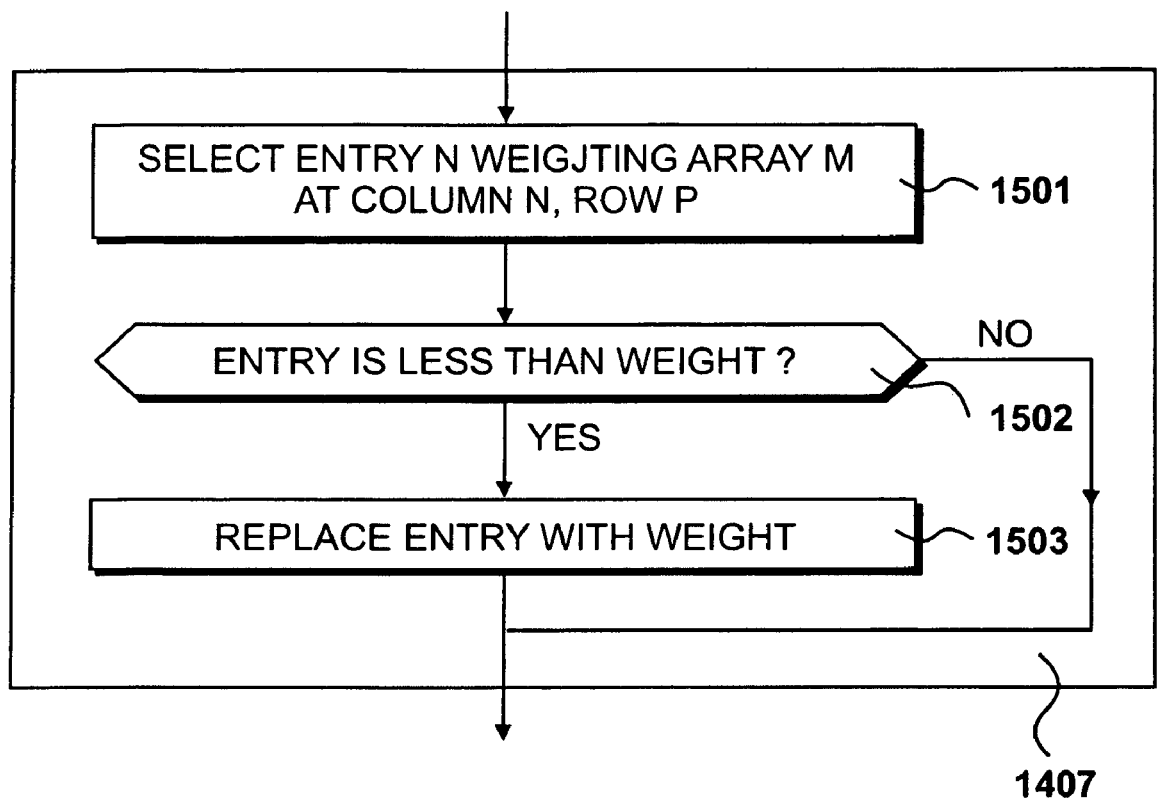
FIG. 15 details the storing of a weight, according to one embodiment of the present invention.

FIG. 15 details step 1407 at which the weight for the identified keyframe N is stored in the weighting array, according to one embodiment of the present invention. At step 1501 the entry in the array at row N, column P is identified and at step 1502 a question is asked as to whether that entry is less than the weight which is to be stored. If this question is answered in the affirmative, as will always be the case if no weight has yet been stored since the entry will be zero, then at step 1503 the entry is replaced with the weight.

However, if a weight has already been stored in that position in the array, as will happen if the user has specified two keyframes on the same curve that have overlapping ranges, then the existing entry may be larger than the weight to be entered and in this case the question asked at step 1502 is answered in the negative and the weight is not stored. Thus if a keyframe has two or more possible weights then the larger is always assigned.

Figure 16:
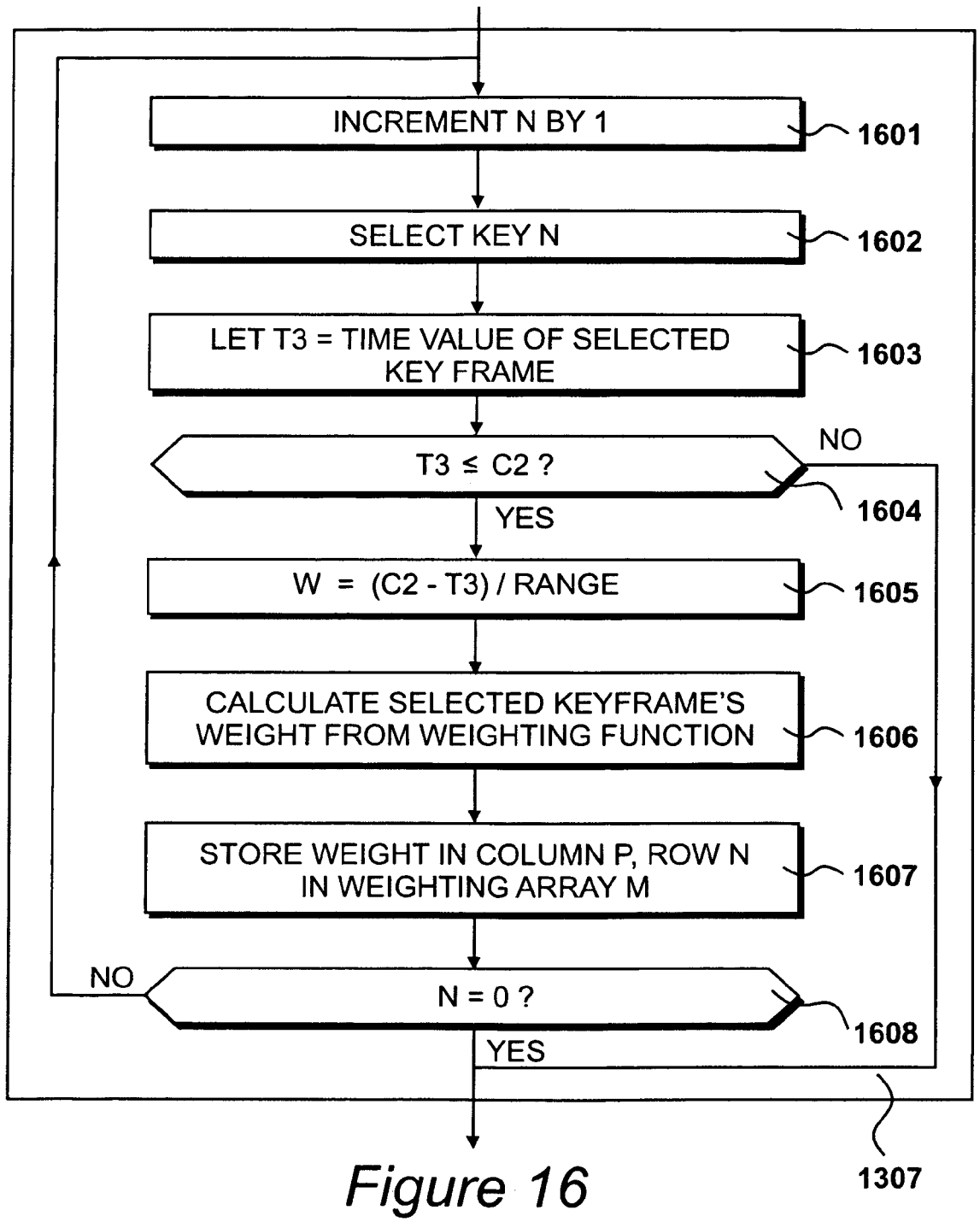
FIG. 16 shows the calculation of weights for keyframes that come after the selected keyframe, according to one embodiment of the present invention.

FIG. 16 details step 1306 at which weights are calculated for keyframes that come after the selected keyframe, according to one embodiment of the present invention. The variable N was reset to the ID of the selected keyframe or point3 controller at step 1409 and so at step 1601 the variable N is incremented by one. At step 1602 the keyframe with an ID equal to the new value of N is identified. In other words, the keyframe immediately following the selected keyframe is identified. At step 1603 a variable T3 is set to be the time value of this identified keyframe and at step 1604 a question is asked as to whether this time value is less than or equal to the cutoff point C2. If this question is answered in the negative then the identified keyframe does not fall within the range specified by range parameter 628. This means that all of the keyframes following the identified keyframe also fall outside the range and thus step 1307 is concluded.

If however the question asked at step 1604 is answered in the affirmative then the identified keyframe does fall within the range and so a value for variable W is calculated for this keyframe at step 1605. W is defined as variable T3 subtracted from the cutoff point C2, all divided by range parameter 628. Thus the value of the variable W is the distance between the time value of the identified keyframe and the upper cutoff point C2, normalised such that a keyframe at the cutoff point would have a W value of zero while the selected keyframe, which has a time value of T1, has a value for W of one.

At step 1606 the identified keyframe's value for W is input into the weighting function identified at step 1001 in order to give its actual weight and at step 1607 this weight is stored in the weighting array for the track at row N, column P. This is carried out in the same way as step 1407 as detailed in FIG. 15.

At step 1608 a question is asked as to whether the current value of variable N is (I−1), in other words whether keyframe N is the last in the track. If this question is answered in the negative then control is returned to step 1601 and N is incremented by one. If the question is answered in the affirmative then all the assignee keyframes have had a weight assigned to them and so step 1307, and hence step 1007, is concluded.

Figure 17:
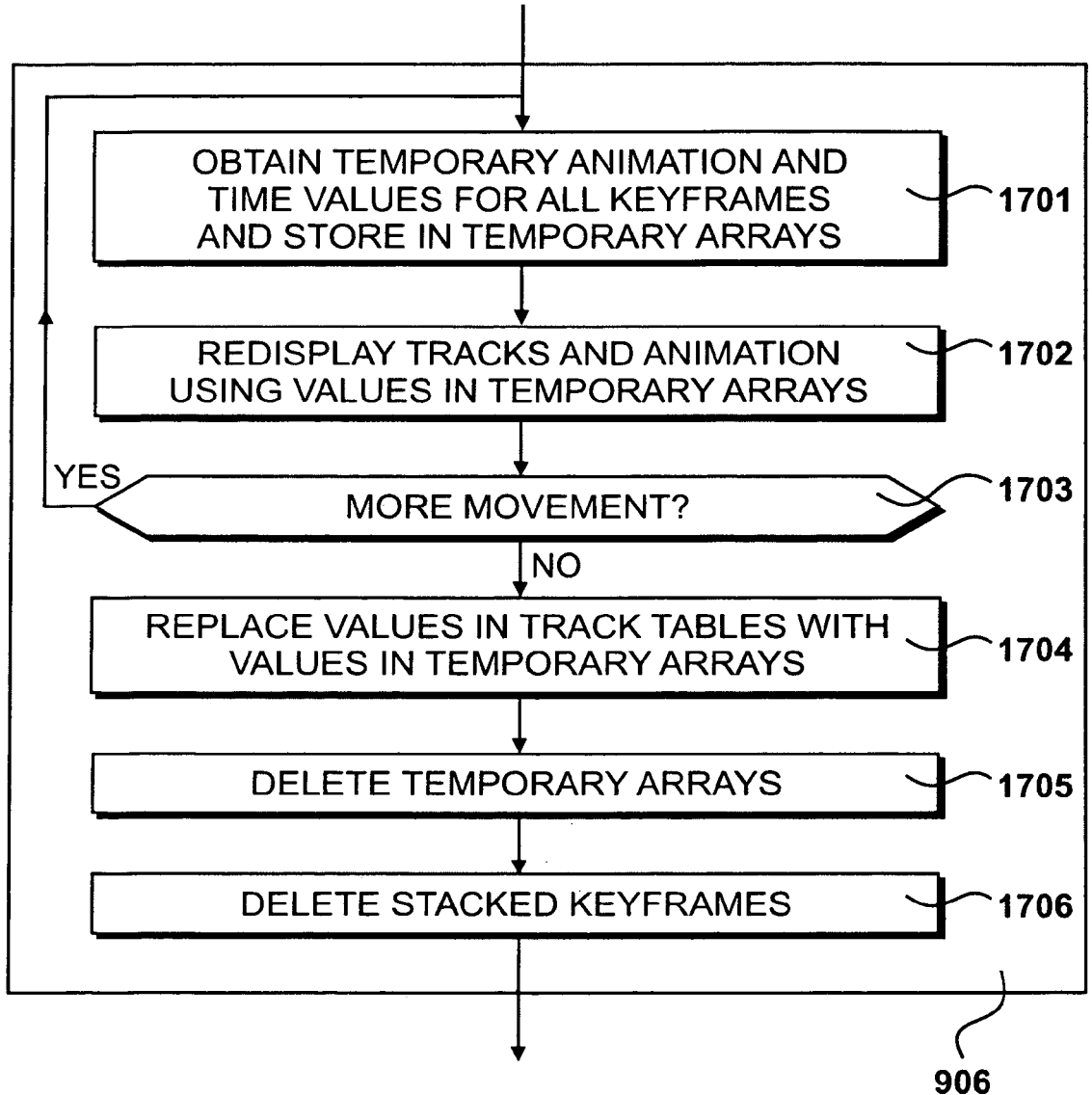
FIG. 17 shows the movement of keyframes after weights have been assigned, according to one embodiment of the present invention.

FIG. 17 details step 904 at which the movement of all the keyframes is processed once the weights have been assigned, according to one embodiment of the present invention. At step 1701 new animation and time values are obtained for the keyframes in the tracks that contain specified keyframes and these are stored in the temporary arrays. At step 1702 the affected tracks are redisplayed and the animation is redisplayed in the scene windows according to the new animation data. At step 1703 a question is asked as to whether there is more movement. This is answered in the affirmative by the user, still holding down the mouse button, indicating more movement and in this case control is returned to step 1701.

However, eventually the user will release the mouse button and question 1703 will be answered in the negative. At this point the values in each of the track tables are replaced by the final values in the temporary arrays at step 1704 and at step 1705 the temporary arrays are deleted. At step 1706 keyframes that have become stacked on top of one another due to movement in time are deleted. This will be explained further with reference to FIG. 22.

Figure 18:
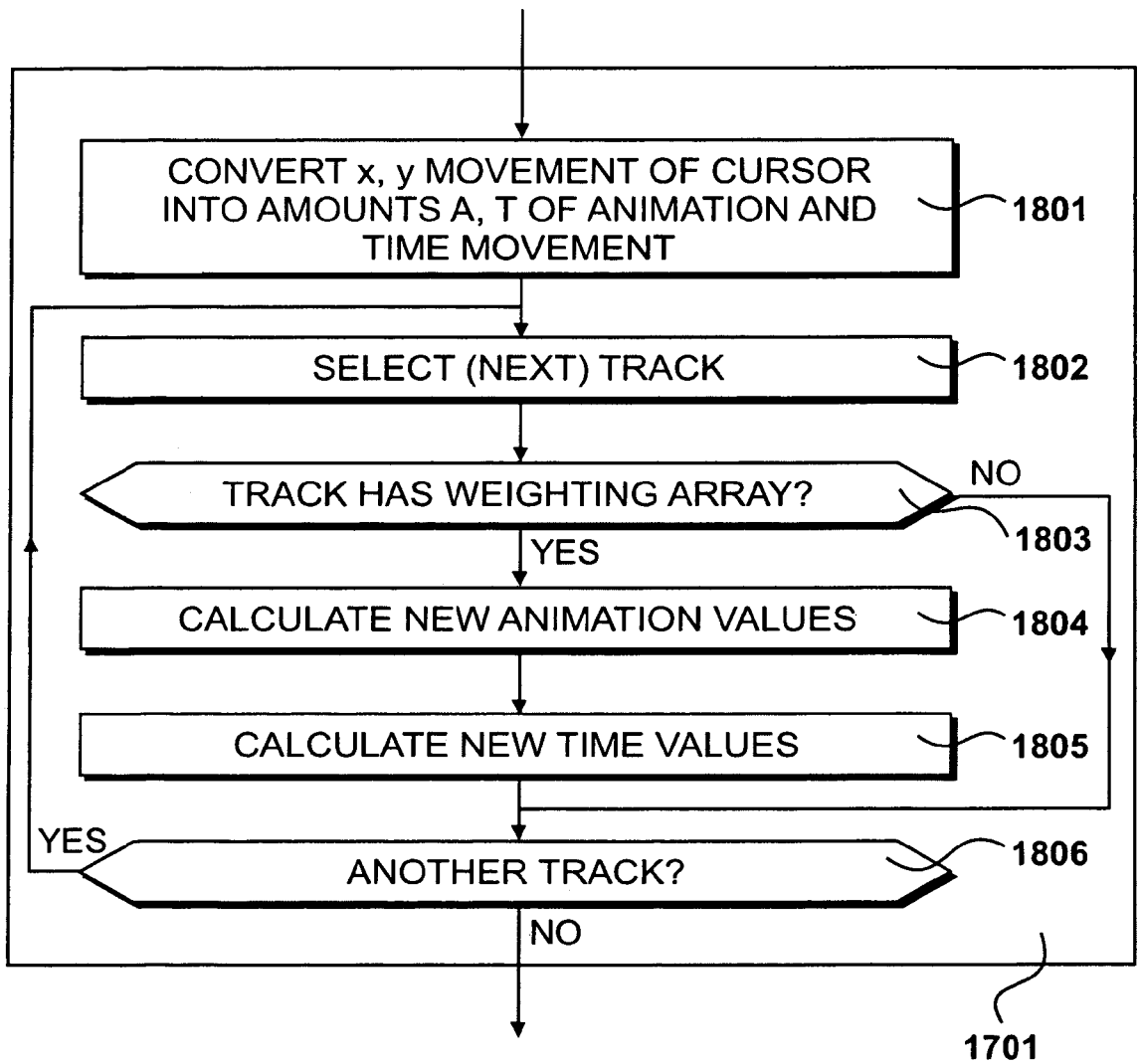
FIG. 18 shows the obtaining of temporary animation data, according to one embodiment of the present invention.

FIG. 18 details step 1701 at which temporary animation and time values are obtained for keyframes in all the affected tracks, according to one embodiment of the present invention. At step 1801 the cursor movement determined by the user's mouse movement is converted into movement within the tracks. Thus the cursor's side-to-side movement is converted into an amount T of time movement and the up-and-down movement is converted into an amount A of movement in animation value. These amounts A and T of movement are always calculated with respect to how far the cursor has moved from its original position, not how far it has moved since A and T were last calculated. Therefore, A and T always represent the total amount of movement that is to be made, rather than incremental amounts.

At step 1802 the first animation track is selected and at step 1803 a question is asked as to whether that track has a weighting array. If this question is answered in the negative then the track does not contain any specified keyframes and so no movement is to be applied to it. Control is thus directed to step 1806 at which a question is asked as to whether there is another track in the animation. If the question asked at step 1803 is answered in the affirmative then at step 1804 new animation values are calculated for each keyframe in the track and stored in a temporary array, and at step 1805 the same function is performed for time values.

At step 1806 a question is asked as to whether there is another track and if this question is answered in the affirmative then control is returned to step 1802 and the next track is selected. If it is answered in the negative then step 1701 is concluded and the temporary arrays have been populated for the current amount of movement.

Figure 19:
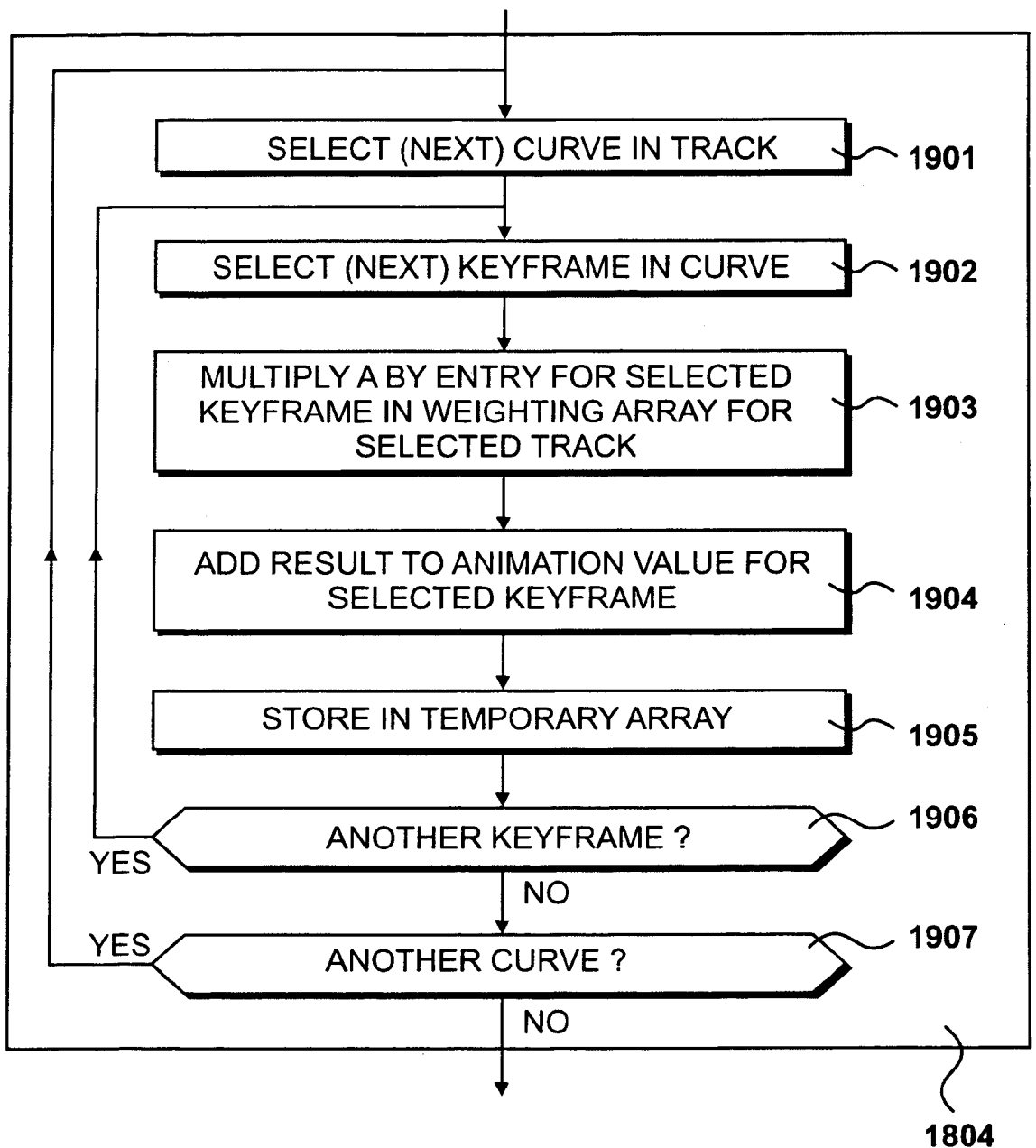
FIG. 19 shows the calculation of temporary animation data, according to one embodiment of the present invention.

FIG. 19 details step 1804 at which temporary animation values are calculated, according to one embodiment of the present invention. At step 1901 the first curve in the selected track is selected and at step 1902 the first keyframe in that curve is selected. At step 1903 the value A is multiplied by the entry for the selected keyframe within the weighting array for the selected track, and at step 1904 the result of step 1903 is added to the animation value for the selected keyframe as stored in the track table. At step 1905 the result of step 1904 is stored in the position in the temporary array at the row corresponding to the keyframe and the column corresponding to the curve. In the temporary array, time values are stored in the first column, the animation values for the first curve are stored in the second column, and so on.

At step 1906 a question is asked as to whether there is another keyframe in the curve and if this question is answered in the affirmative then control is returned to step 1902 and the next keyframe is selected to have an animation value calculated. If the question is answered in the negative then at step 1907 another question is asked as to whether there is another curve in the track and if this question is answered in the affirmative then control is returned to step 1901 and the next curve is selected. If it is answered in the negative than each keyframe in each curve in the track now has a temporary animation value which is stored in the temporary array for the track. It only remains to populate the first column in the array by calculating temporary time values.

Figure 20:
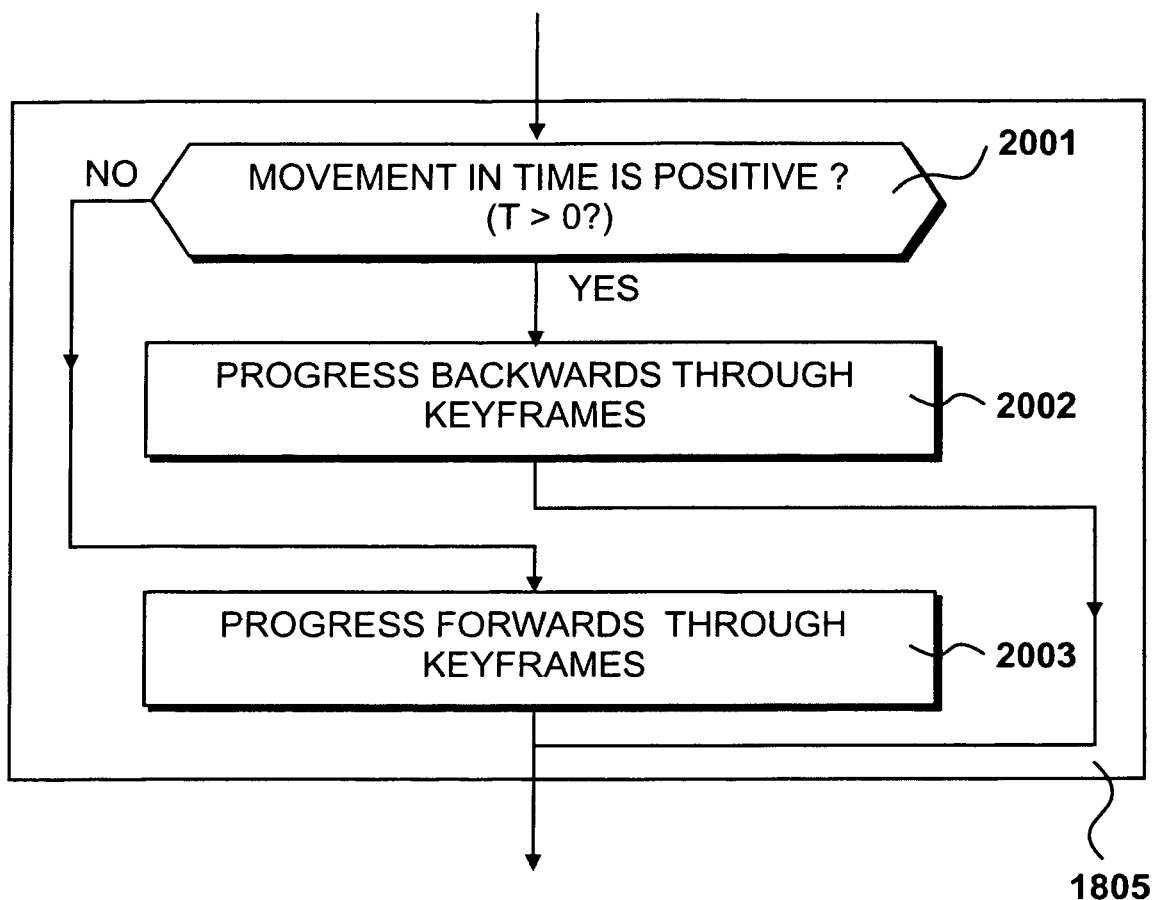
FIG. 20 shows the calculation of temporary time values, according to one embodiment of the present invention.

FIG. 20 details step 1805 at which temporary time values are calculated for all the keyframes in the selected track, according to one embodiment of the present invention. At step 2001 a question is asked as to whether the movement in time, as indicated by the value of T, is positive. If this question is answered in the affirmative, then new time values are calculated by progressing backwards through the keyframes at step 2002, while if it is answered in the negative, then the new time values are calculated by progressing forwards through them at step 2003.

Figure 21:
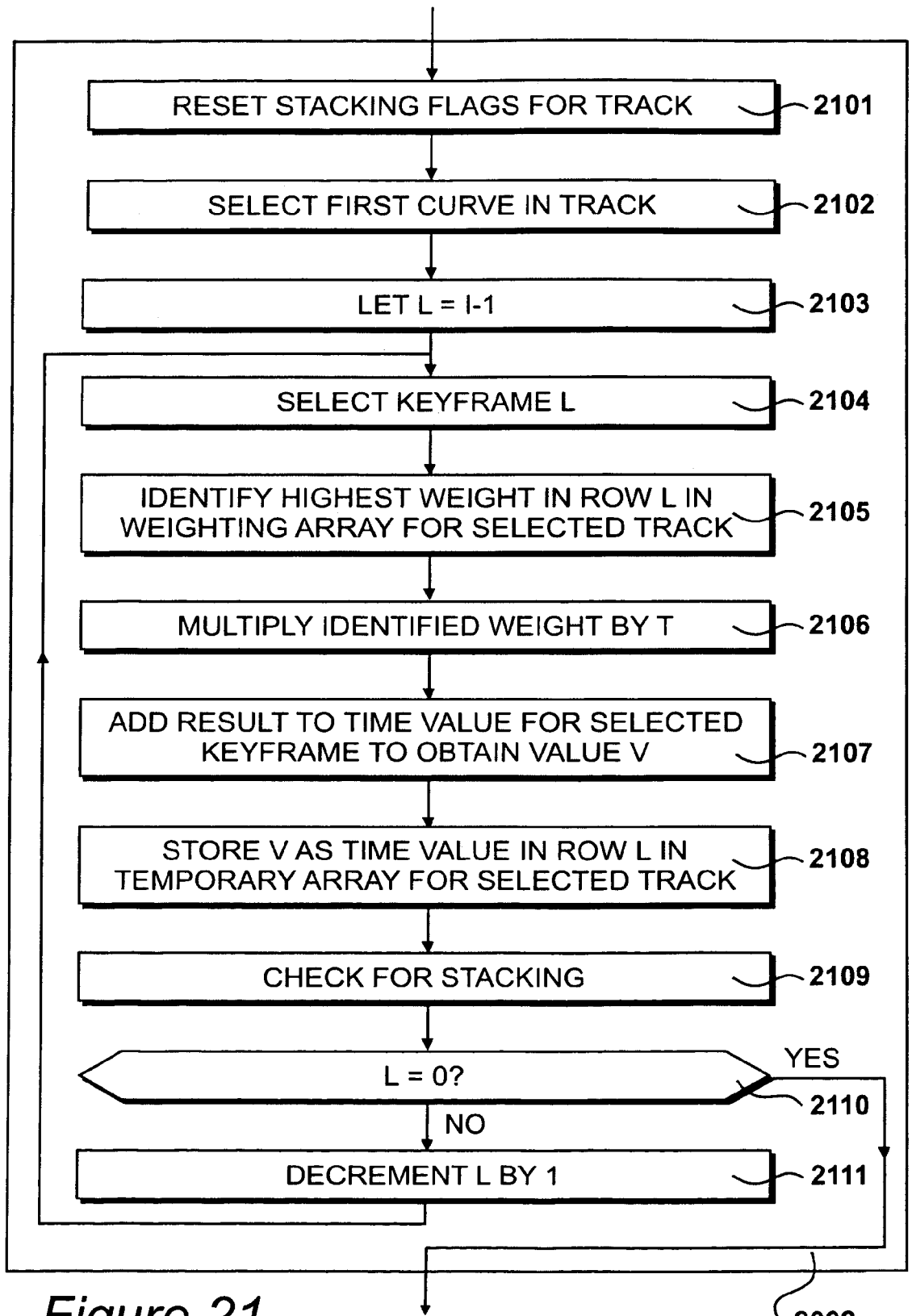
FIG. 21 shows the calculation of new time values, according to one embodiment of the present invention.

FIG. 21 details step 2002 at which new time values for each keyframe in the track are calculated by progressing backwards through the keyframes, according to one embodiment of the present invention. At step 2101 stacking flags for the track are reset. The use of these flags will be explained further with reference to FIG. 22. At step 2102 the first curve in the track is selected and at step 2103 a variable L is initialised to be the keyframe ID of the last keyframe in the track. At step 2104 the keyframe with this ID is selected.

At step 2105 the highest weight in row L in the weighting array for the selected track is identified. Thus if the track contains more than one curve, as for example does track 601, then although the keyframes on each track may move in value individually from the others controlled by the same point3 controller, they must all move together in time. Thus if three keyframes controlled by the same point3 controller all have different weights the largest of those weights is used to weight the movement through time of all three.

At step 2106 the identified weight is multiplied by the amount of time movement T and at step 2107 the result of step 2106 is added to the time value in the track table for the selected keyframe or controller to obtain a value V. At step 2108 this value V is stored as the time value in row L in the temporary array for the selected track.

At step 2109 the system checks for stacking of keyframes. At step 2110 a question is asked as to whether the value of L is equal to zero and if this question is answered in the negative then L is decremented by one at step 2111 and control is returned to step 2104 where keyframe L is selected. If the question asked at step 2110 is answered in the affirmative then all of the keyframes have been processed and step 2002 is complete.

Figure 22:
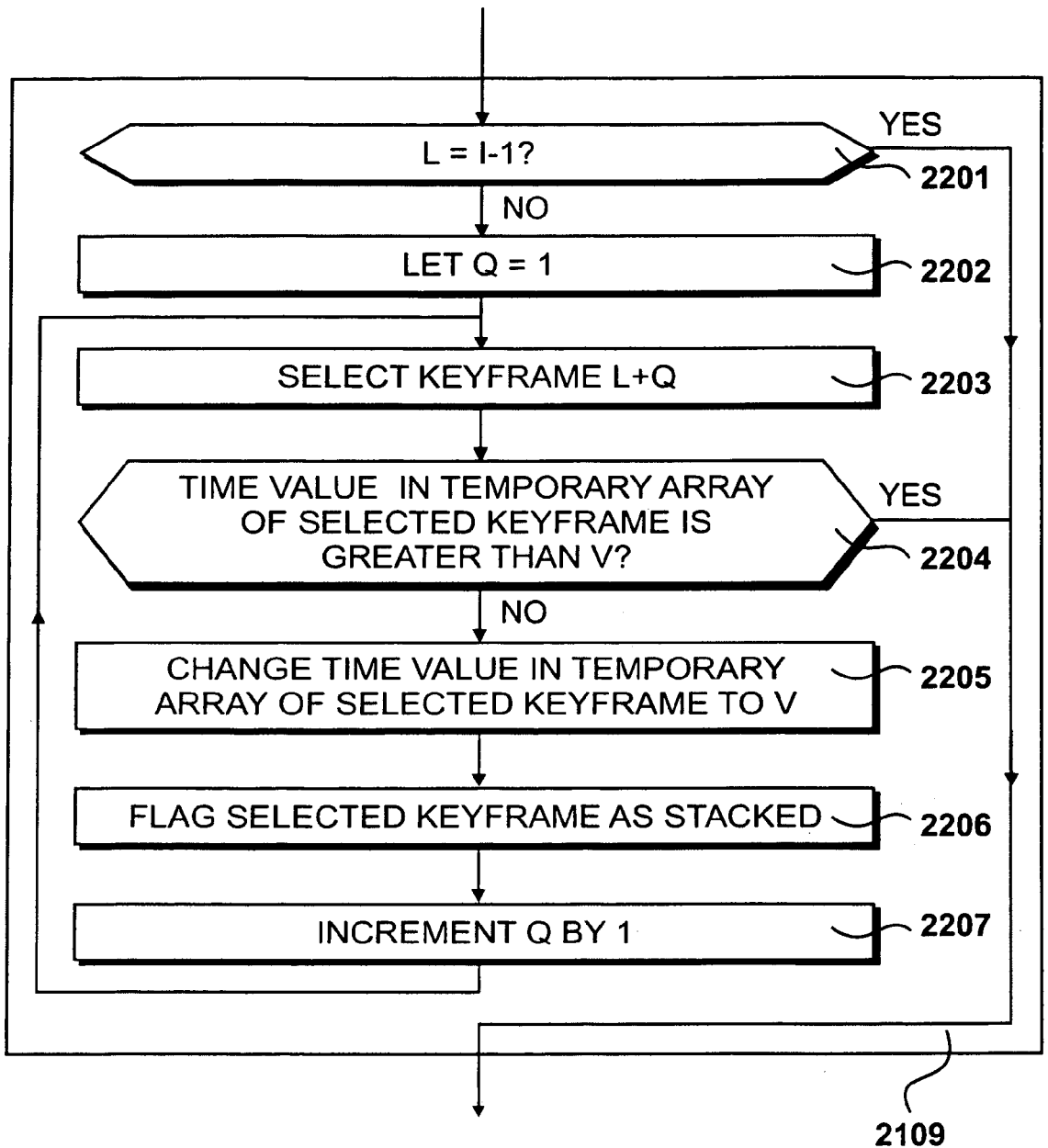
FIG. 22 shows checking for the stacking of keyframes, according to one embodiment of the present invention.

FIG. 22 details step 2109 at which the process checks for the stacking of keyframes, according to one embodiment of the present invention. At step 2201 a question is asked as to whether L currently equals (I−1), that is the last keyframe ID in the track. If this question is answered in the affirmative, as it will be on the first iteration of this process, then the step is concluded since only one keyframe has been processed and no stacking can have taken place yet.

However, if it is answered in the negative then at step 2202 a new variable Q is initialised to be one and at step 2203 the keyframe with the ID of the sum of L and Q is selected, which in the first instance would be the keyframe immediately after keyframe L.

This keyframe already has already been processed according to step 2002 and therefore already has a time value in the temporary array. Thus at step 2204 a question is asked as to whether this time value is greater than V, which is the new time value for keyframe L. If this question is answered in the affirmative then step 2109 is concluded since the selected keyframe, coming after keyframe L as it does, should indeed have a time value greater than V. Conversely, if the question asked at step 2204 is answered in the negative then stacking has occurred. In this case then at step 2205 the time value for the selected keyframe in the temporary array is changed to V and at step 2206 the keyframe is flagged as stacked.

At step 2207 Q is incremented by one and control is returned to step 2203 where the keyframe with the ID of (L+Q), ie the next keyframe on from the last one, is selected and this one is checked for stacking. Once a keyframe has been found that is not stacked then there is no need to check the rest since they have already been checked during previous iterations of step 2002.

Thus step 2109 checks to see whether a keyframe has overtaken another one and if it has the keyframes are stacked together. The overtaken keyframe is later deleted at step 1706. However, the fact that it is stacked is displayed to the user at step 1702 when the tracks are re-displayed according to the values in the temporary array, and thus if a user does not wish the keyframe to be deleted, he can keep the mouse button held down and decrease the amount of movement in time before releasing the mouse button.

Figure 23:
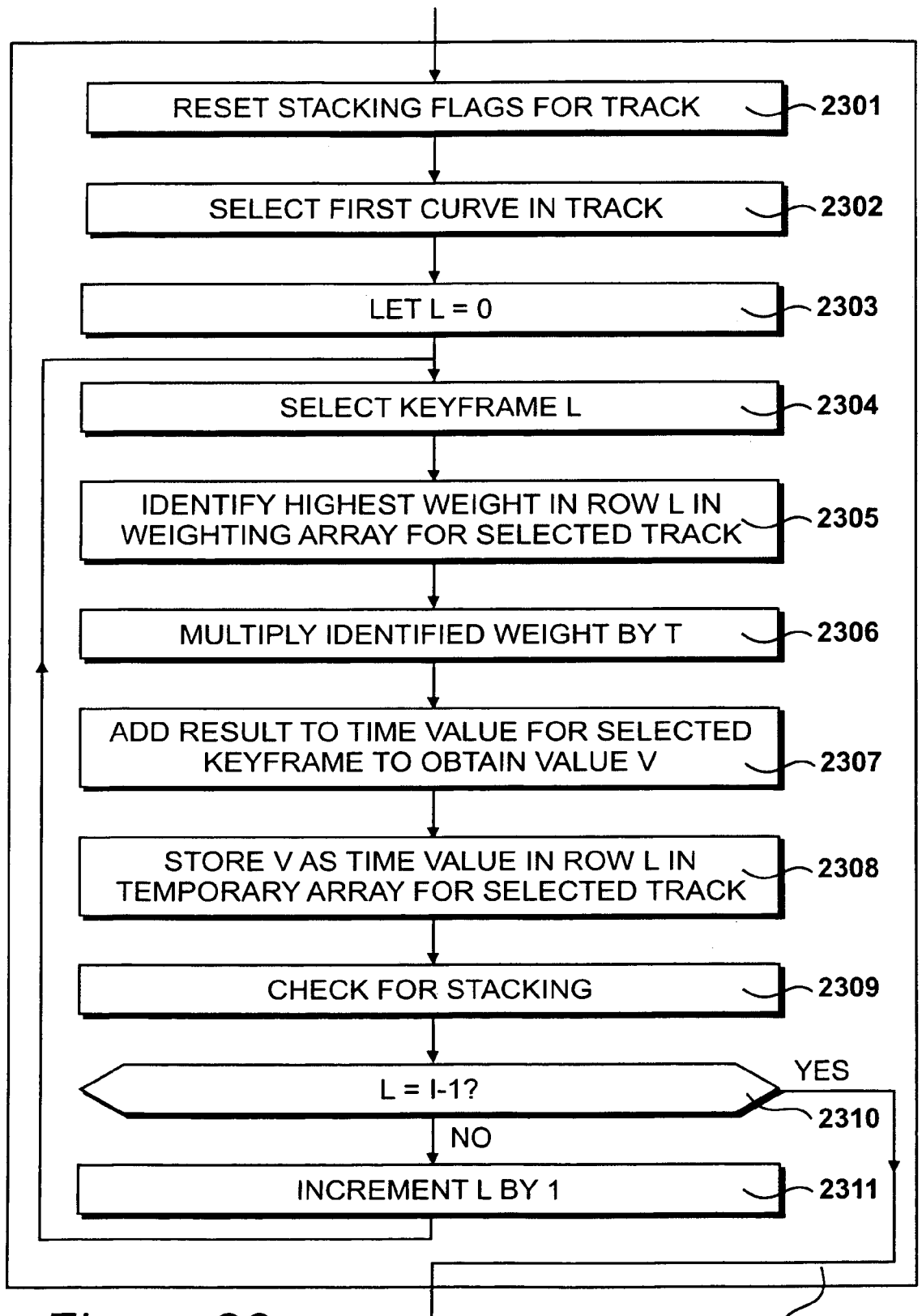
FIG. 23 shows the calculation of time values, according to one embodiment of the present invention.

FIG. 23 details step 2003 at which new time values for each keyframe in the track are calculated by progressing forwards through the keyframes, according to one embodiment of the present invention. This step is taken instead of step 21 if the value of T is less than zero, that is the user is moving the time values backwards. At step 2301 stacking flags for the track are reset. At step 2302 the first curve in the track is selected and at step 2303 a variable L is initialised to be zero. At step 2304 the keyframe with this ID, ie the first keyframe in the track, is selected.

At step 2305 the highest weight in row L in the weighting array for the selected track is identified. As with step 2105, if three keyframes controlled by the same point3 controller all have different weights the largest of those weights is used to weight the movement through time of all three. (There is thus no need to process the other curves in the track.)

At step 2306 the identified weight is multiplied by the amount of time movement T and at step 2307 the result of step 2306 is added to the time value in the track table for the selected keyframe or controller to obtain a value V. At step 2308 this value V is stored as the time value in row L in the temporary array for the selected track.

At step 2309 the system checks for stacking of keyframes. At step 2310 a question is asked as to whether the value of L is equal to (I−1), ie the last keyframe in the track, and if this question is answered in the negative then L is incremented by one at step 2311 and control is returned to step 2304 where keyframe L is selected. If the question asked at step 2310 is answered in the affirmative then all of the keyframes have been processed and step 2003 is complete.

Following the completion of this step or step 2002 control is directed to step 1702 where the time and animation values thus calculated and stored in the temporary array are used to re-display the tracks and the animation, which will be described further with reference to FIG. 25. If the user does not move the cursor further then these values will be used to replace the ones currently in the track table, but if there is further movement than they themselves will be overwritten by new temporary values.

Figure 24:
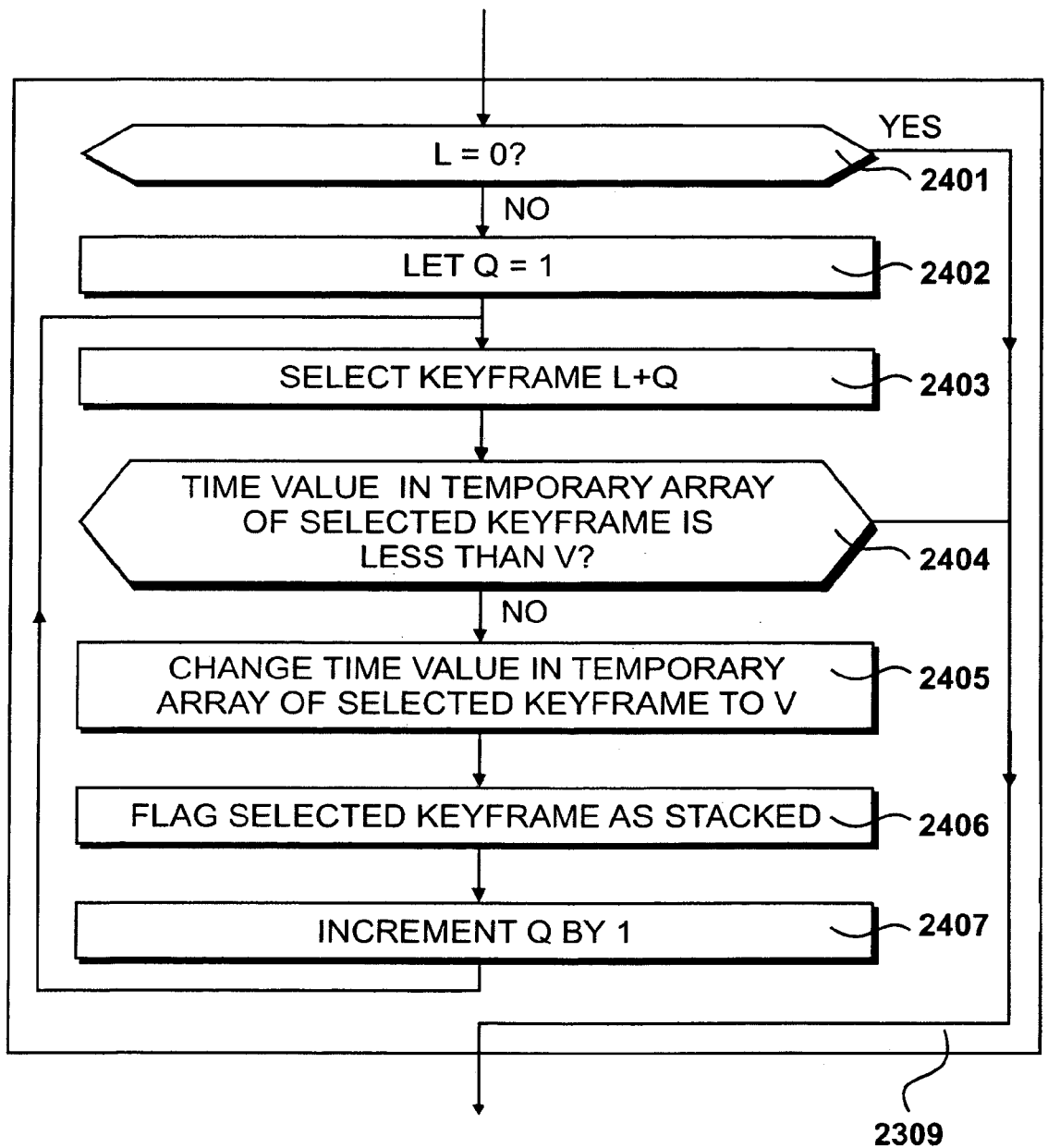
FIG. 24 shows the checking of keyframe stacking, according to one embodiment of the present invention.

FIG. 24 details step 2309 at which the process checks for the stacking of keyframes, according to one embodiment of the present invention. At step 2401 a question is asked as to whether L currently 0, that is whether the selected keyframe is the first keyframe in the track. If this question is answered in the affirmative, as it will be on the first iteration of this process, then the step is concluded since only one keyframe has been processed and no stacking can have taken place yet.

However, if it is answered in the negative then at step 2402 a new variable Q is initialised to be one and at step 2403 the keyframe with the ID of (L−Q) is selected, which in the first instance would be the keyframe immediately before keyframe L.

This keyframe already has already been processed according to step 2003 and therefore already has a time value in the temporary array. Thus at step 2404 a question is asked as to whether this time value is less than V, which is the new time value for keyframe L. If this question is answered in the affirmative then step 2309 is concluded since the selected keyframe, coming before keyframe L as it does, should indeed have a time value of less than V. Conversely, if the question asked at step 2404 is answered in the negative then stacking has occurred. In this case then at step 2405 the time value for the selected keyframe in the temporary array is changed to V and at step 2406 the keyframe is flagged as stacked.

At step 2407 Q is incremented by one and control is returned to step 2403 where the keyframe with the ID of (L−Q), ie the next previous keyframe, is selected and this one is checked for stacking. Once a keyframe has been found that is not stacked then there is no need to check the rest since they have already been checked during previous iterations of step 2003.

Thus step 2309 checks to see whether a keyframe has overtaken another one and if it has the keyframes are stacked together. The overtaken keyframe is later deleted at step 1706. However, the fact that it is stacked is displayed to the user at step 1702 when the tracks are re-displayed according to the values in the temporary array, and thus if a user does not wish the keyframe to be deleted, he can keep the mouse button held down and decrease the amount of movement in time before releasing the mouse button.

Figure 25:
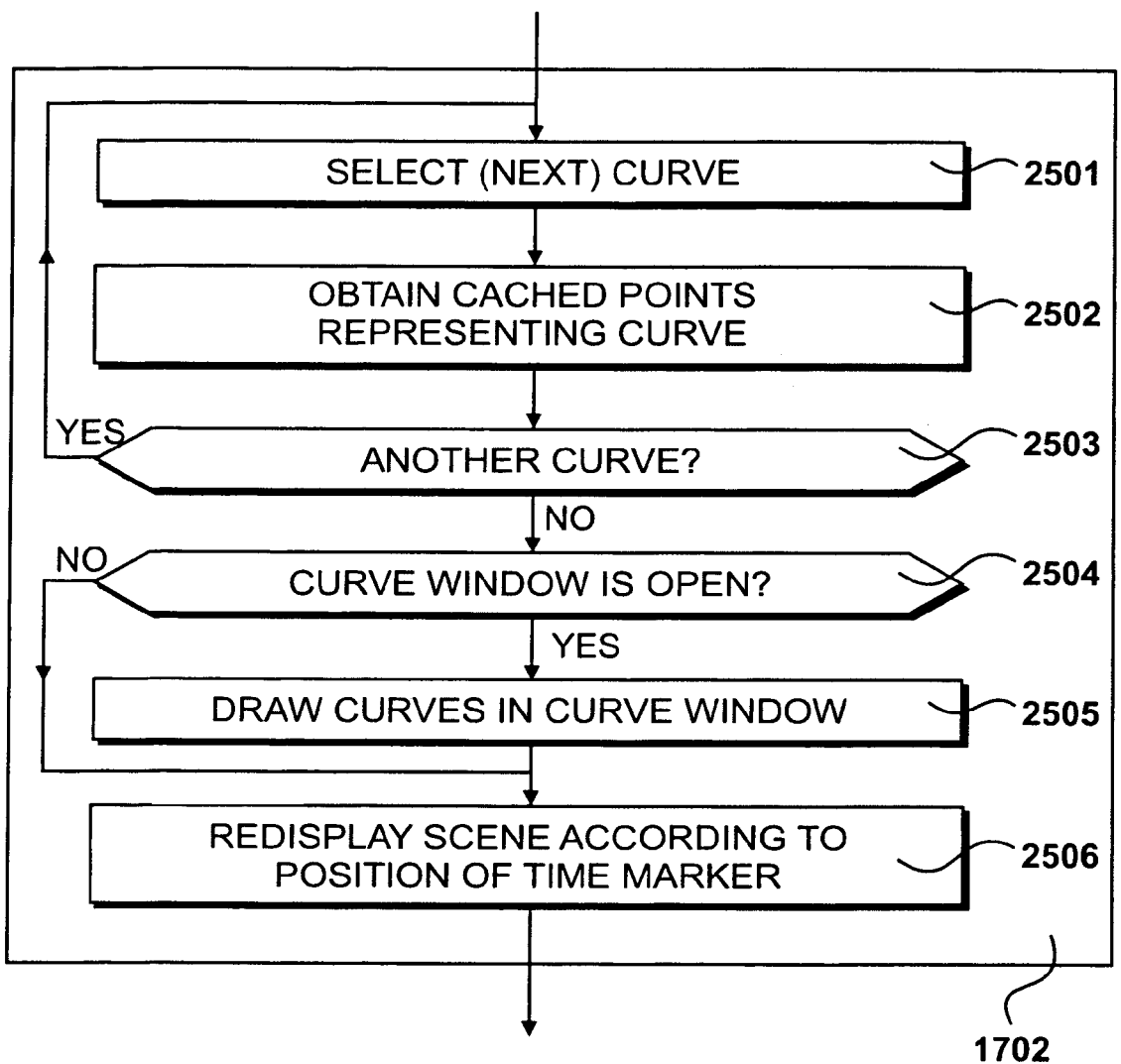
FIG. 25 shows the recalculation of animation data, according to one embodiment of the present invention.

FIG. 25 details step 1702 at which the animation data defining each of the affected curves are recalculated and displayed and the animation in scene 511 is redisplayed based on the new animation data, according to one embodiment of the present invention. At step 2501 the first curve in the animation is selected and at step 2502 the Bezier curves that define the interpolation between the keyframes are calculated and cached.

At step 2503 a question is asked as to whether there is another curve in the animation, and if this question answered in the affirmative then control is returned to step 2501 and the next curve is selected. If it is answered in the negative then at step 2404 another question is asked as to whether the curve window 505 is open and if this question is answered in the affirmative then the curves are drawn.

At this point, and if the question asked at step 2503 is answered in the negative, then at step 2506 the position of every character and object in scene 511 is calculated and displayed according to the current position of marker 615. As shown in FIG. 6, this marker shows the animation value of every curve at the time position of the marker. However, this is only a visual aid. The actual animation is displayed using the cached animation values. Alternatively, the animation values are recalculated for each curve as the animation progresses.

Figure 26:
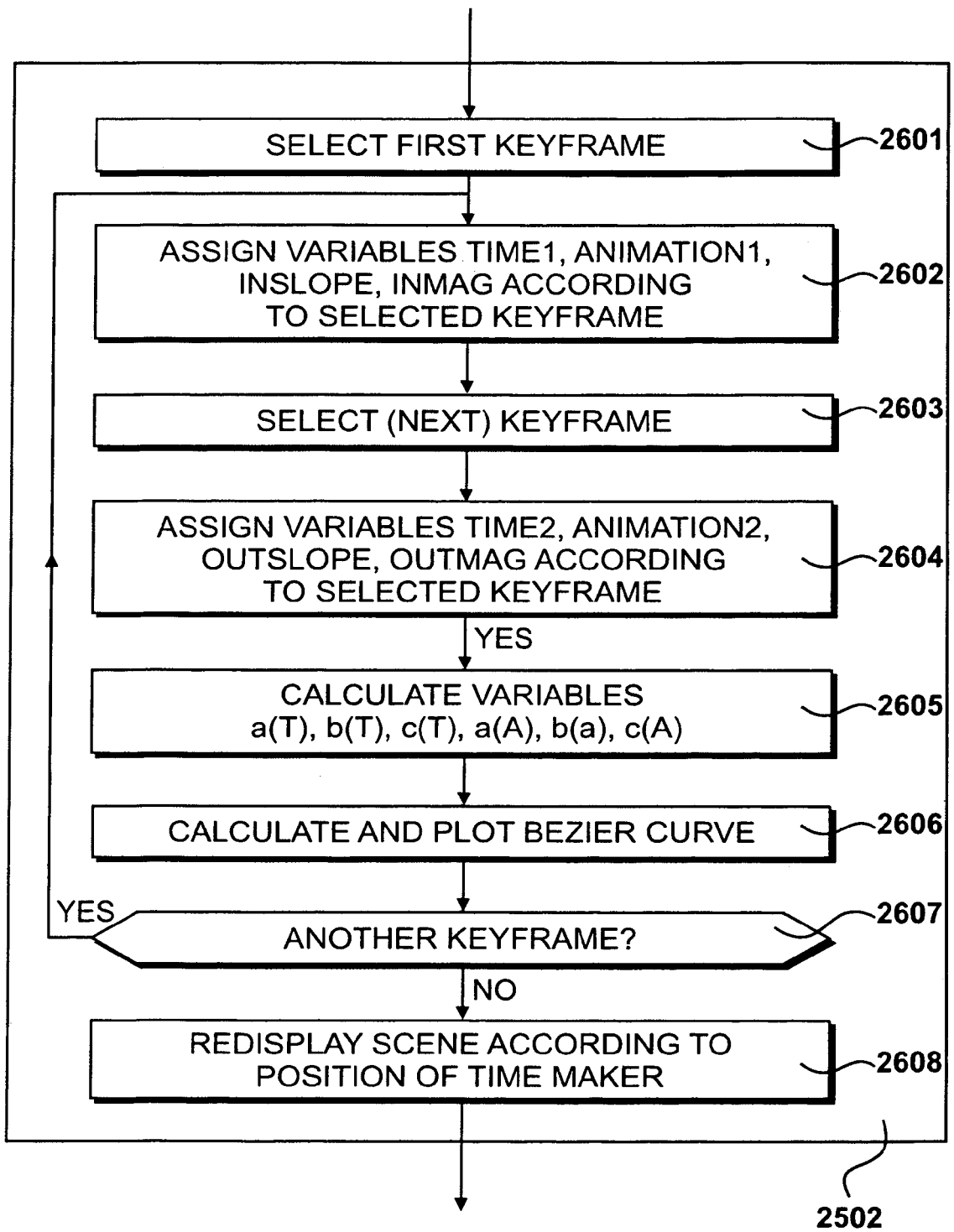
FIG. 26 details the calculation and caching of Bezier values, according to one embodiment of the present invention.

FIG. 26 details step 2502 at which the cached points representing the selected curve are obtained, according to one embodiment of the present invention. At step 2601 the first keyframe in the track is selected and at step 2602 four variables TIME1, ANIMATION1, INSLOPE and INMAG are assigned according to the selected keyframe. At step 2603 the next keyframe in the track is selected and at step 2604 four more variables TIME2, ANIMATION2, OUTSLOPE and OUTMAG are assigned according to this selected keyframe.

At step 2605 six variables a(T), b(T), c(T), a(A), b(A) and c(A) are calculated using the variables assigned at steps 2602 and 2604 and at step 2606 Bezier values are calculated and plotted using these new variables.

At step 2607 a question is asked as to whether there are any more keyframes in the track. If this question is answered in the affirmative then control is returned to step 2602 and the first set of variables is redefined according to the selected keyframe before another keyframe is selected at step 2603.

Figure 27:
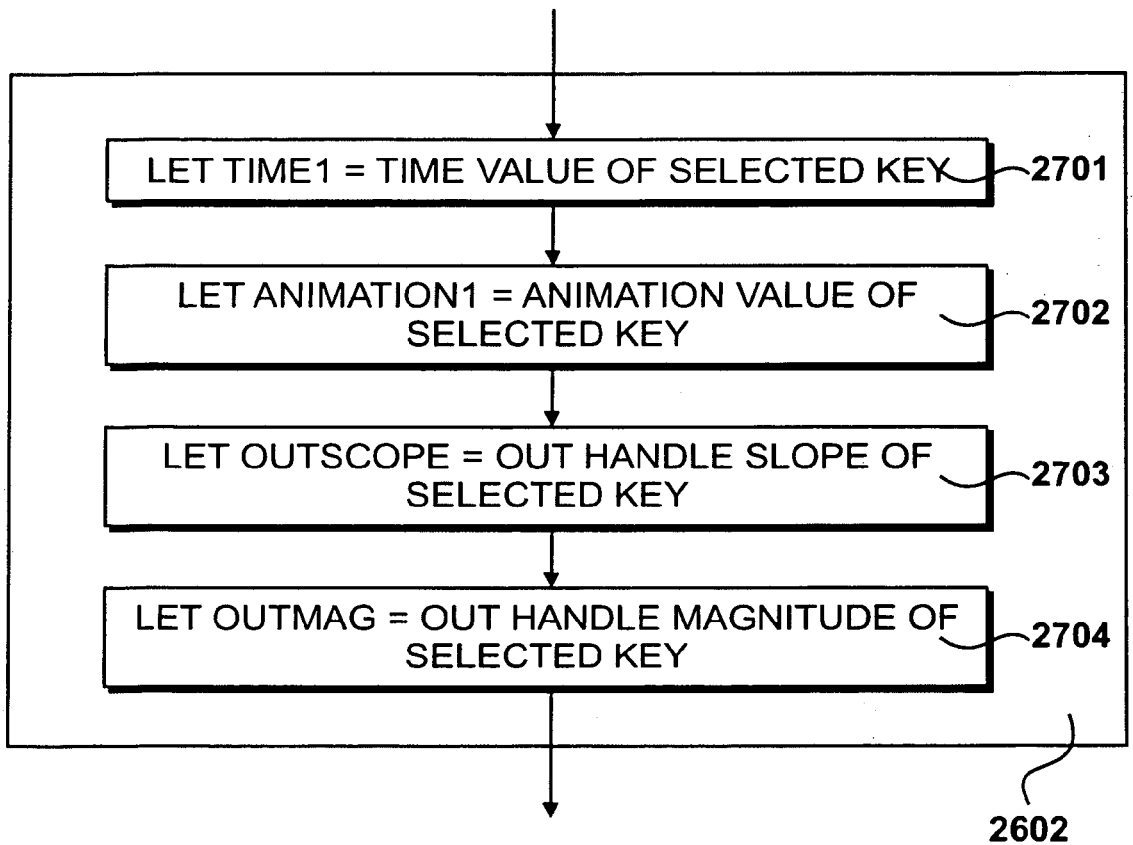
FIG. 27 details an assignment of variables, according to one embodiment of the present invention.

FIG. 27 details step 2602 at which the first set of variables is assigned, according to one embodiment of the present invention. At step 2701 variable TIME1 is set to be the time value of the selected keyframe and at step 2702 variable ANIMATION1 is set to be the animation value of the selected keyframe. At step 2703 the variable OUTSLOPE is set to be the out handle slope of the selected keyframe and at step 2704 the variable OUTMAG is set to be the out handle magnitude of the selected keyframe. All these values are obtained from the track table 701 for the track being redisplayed.

Figure 28:
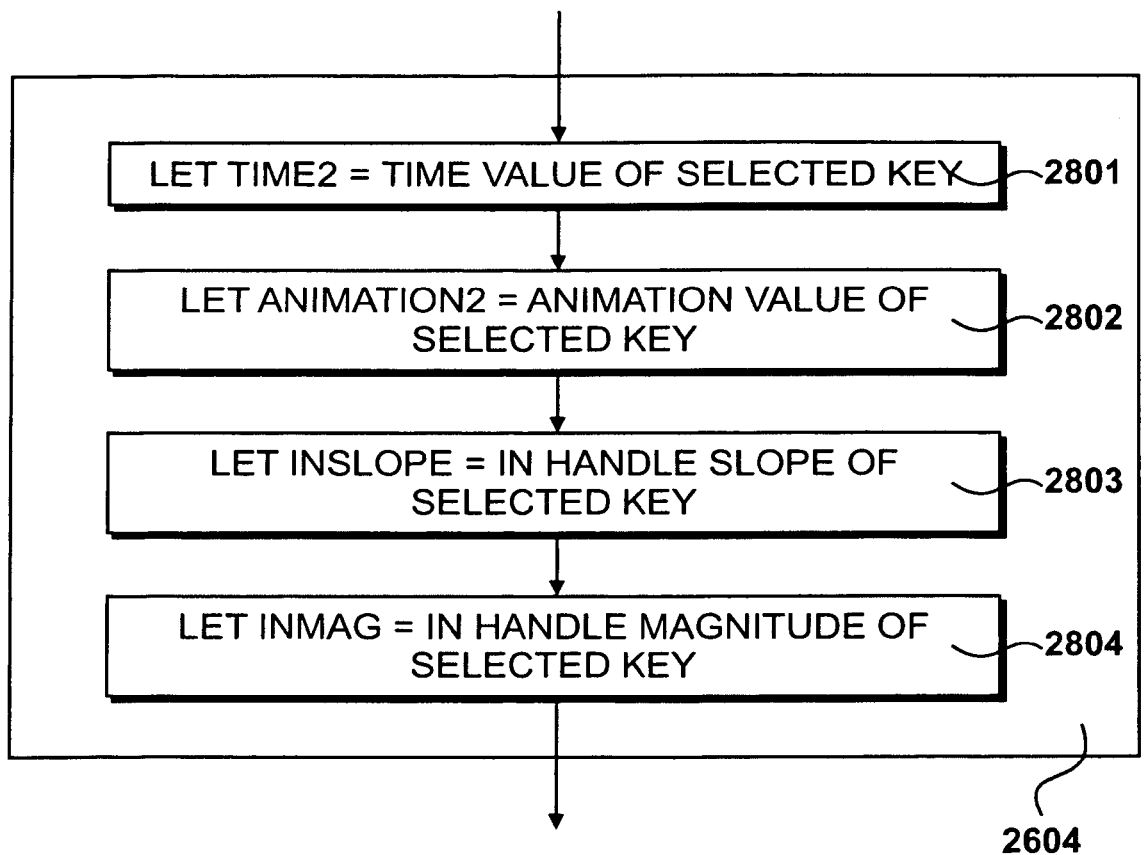
FIG. 28 shows a second set of variables being assigned, according to one embodiment of the present invention.

FIG. 28 details step 2604 at which the second set of variables is assigned, according to one embodiment of the present invention. At step 2801 variable TIME2 is set to be the time value of the selected keyframe and at step 2802 variable ANIMATION2 is set to be the animation value of the selected keyframe. At step 2803 the variable INSLOPE is set to be the in handle slope of the selected keyframe and at step 2804 the variable INMAG is set to be the in handle magnitude of the selected keyframe. All these values are obtained from the track table 701 for the track being redisplayed.

Thus after step 2604 the necessary values to calculate a single Bezier curve between two keyframes have been obtained, ie the time and animation values of both keyframes, the slope and magnitude of the out handle of the first keyframe and the slope and magnitude of the in handle of the second keyframe.

Figure 29:
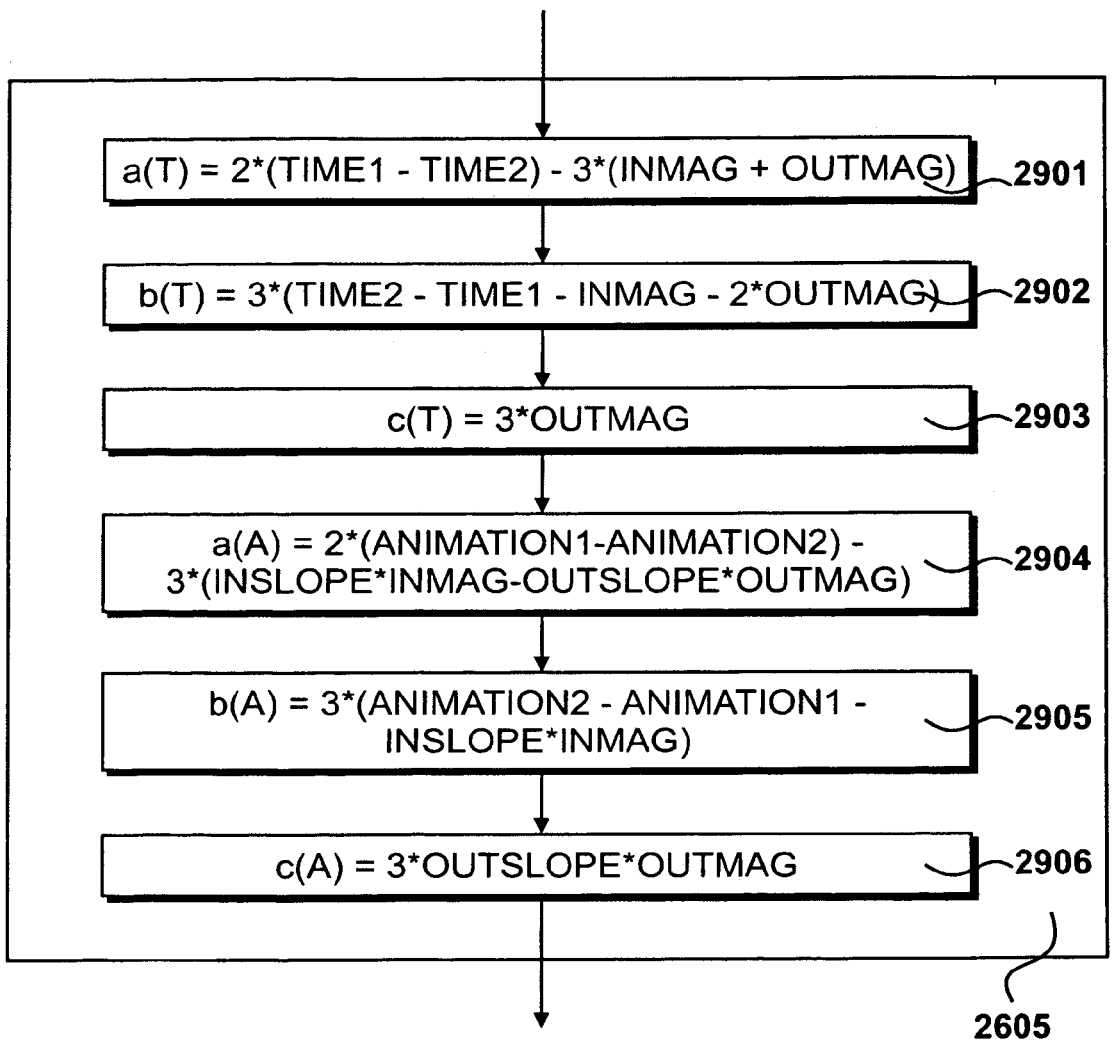
FIG. 29 shows a third set of variables being assigned, according to one embodiment of the present invention.

FIG. 29 details step 2605 at which the third set of variables is calculated, according to one embodiment of the present invention. At step 2901 the variable a(T) is calculated as the sum of INMAG and OUTMAG multiplied by three, subtracted from the product of two and TIME2 subtracted from TIME1.

At step 2902 the variable b(T) is calculated as the product of two and OUTMAG added to INMAG and TIME1, all subtracted from TIME2, all multiplied by three.

At step 2903 the variable c(T) is calculated as the product of three and OUTMAG.

At step 2904 the variable a(A) is calculated as the product of OUTSLOPE and OUTMAG subtracted from the product of INSLOPE and INMAG, all multiplied by three, all subtracted from the product of two and ANIMATION2 subtracted from ANIMATION1.

At step 2905 the variable b(A) is calculated as the product of INSLOPE and INMAG added to ANIMATION1, all subtracted from ANIMATION2, all multiplied by three.

At step 2905 the variable c(A) is calculated as the product of three, OUTSLOPE and OUTMAG.

Figure 30:
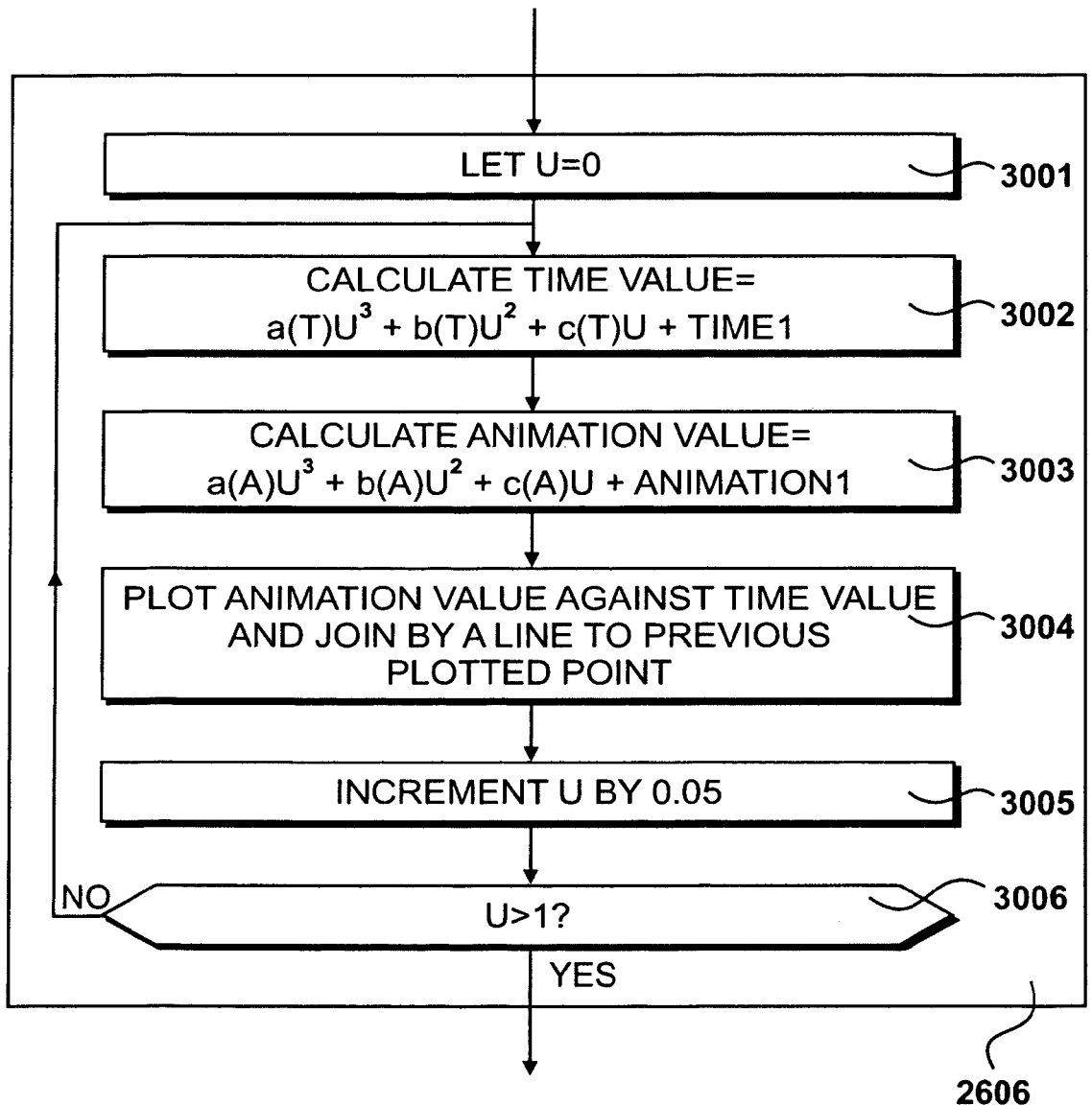
FIG. 30 shows the calculation of a Bezier curve, according to one embodiment of the present invention.

FIG. 30 details step 2606 at which the Bezier curve between the two keyframes is calculated and plotted, according to one embodiment of the present invention. A Bezier curve is a parametric curve, meaning that the input of a single variable into two different equations gives two results. These results are then plotted against each other to give the curve.

At step 3001 a variable U is set to be zero. At step 3002 a time value is calculated and cached as the sum of the following products: a(T) and U cubed, b(T) and U squared, c(T) and U, and TIME1 and 1.

At step 3003 an animation value is calculated and cached as the sum of the following products: a(A) and U cubed, b(A) and U squared, c(A) and U, and TIME1 and 1.

At step 3004 the animation value obtained at step 3003 is plotted against the time value obtained at step 3004 on the display for the track being changed. A straight line is drawn between the point just plotted and the previous point.

At step 3005 U is incremented, in this example by 0.05, and at step 3006 a question is asked as to whether U is now greater than one. If this question is answered in the negative then control is returned to step 3002 and the next time value is calculated. If it is answered in the negative then a Bezier curve between the two keyframes has been calculated and plotted and step 2606 is completed.

The exact amount by which U is incremented at step 3004 is an implementation detail, although it must be a number which is a factor of one, for example 0.2, 0.1 or 0.05 but not 0.03. The smaller this number, the more points are plotted; the more points are plotted, the smoother the Bezier curve will be but the longer it will take to calculate. It is also possible that the incrementing of U could be dependent upon the distance in time and/or value between two keyframes, ie the further apart they are the smaller an amount U is incremented by. In particular, U could be incremented by the reciprocal of the number of frames between keyframes.

Figure 31:
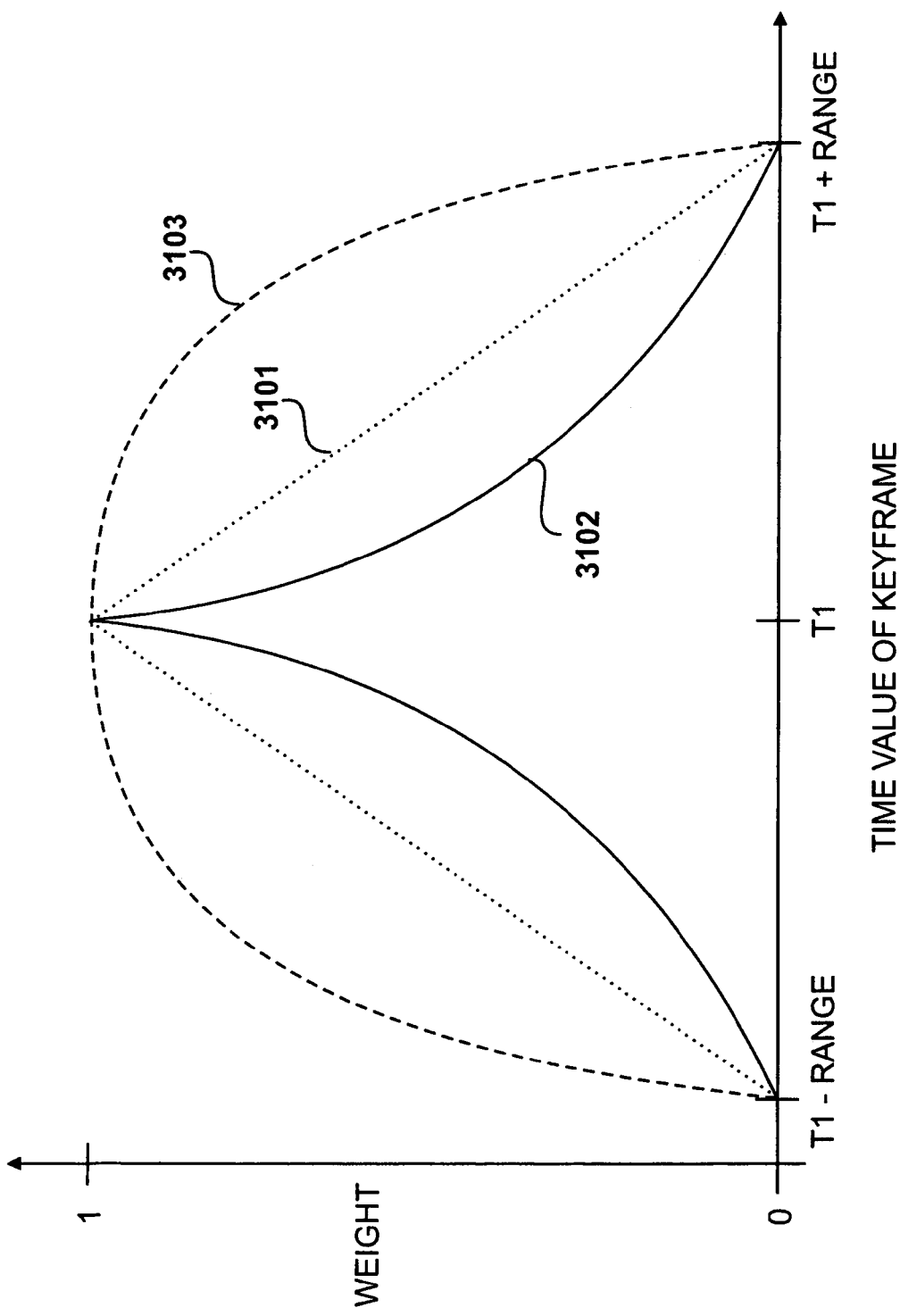
FIG. 31 illustrates falloff weighting functions, according to one embodiment of the present invention.

FIG. 31 illustrates the three different weighting functions, according to one embodiment of the present invention. Dotted line 3101 shows the linear weighting function used if falloff parameter 627 is equal to one. In this case, since falloff parameter 627 is less than or equal to one the weighting function is equal to the weight variable W to the power of the falloff parameter, which equates to simply W. Using this function the weight of a keyframe is only dependent upon its distance from the time value of a specified keyframe.

Solid line 3102 shows the weighting function used if falloff parameter is less than one. The line illustrated is that produced by a falloff parameter of approximately one half. In this case the weighting falls off sharply for keyframes close to the indicated keyframe but then starts to level out for keyframes further away, so that keyframes towards the edge of the range have similar, low, weights, while only keyframes that are very close in time to the indicated keyframe will have relatively high weights.

Dashed line 3103 shows the weighting function used if falloff parameter 627 is greater than one. The line illustrated is that produced by a falloff parameter of approximately three. In this case the weighting is approximately level for keyframes close to the indicated keyframe but then falls off sharply for keyframes further away, so that keyframes towards the middle of the range have similar, high, weights, while only keyframes that are towards the edge of the range will have relatively low weights.

The invention has been described above with reference to specific embodiments. Persons skilled in the art will recognize, however, that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

The invention claimed is:

1. A computer readable medium storing instructions for causing a computer to process image data and produce a modified keyframe value, by performing the steps of:
    selecting a keyframe from animation data including keyframes to produce a selected keyframe;
    assigning a weight to an assignee keyframe included in the animation data, the weight dependent on a distance measured in time between the selected keyframe and the assignee keyframe, wherein the weight assigned to the assignee keyframe is inversely proportional to the distance measured in time between the selected keyframe and the assignee keyframe;
    receiving input data indicating a change in a time value of the selected keyframe; and
    modifying a time value of the assignee keyframe by an amount based on the change in the time value of the selected keyframe and the weight assigned to the assignee keyframe to produce a changed time value.

2. The computer readable medium of claim 1, wherein the input data indicates a change in an animation value of the selected keyframe.

3. The computer readable medium of claim 2, further comprising the step of modifying an animation value of the assignee keyframe by an amount based on the change in the animation value of the selected keyframe and the weight assigned to the assignee keyframe to produce a changed animation value.

4. The computer readable medium of claim 1, wherein the weight assigned to the assignee keyframe is further dependent on a range parameter and any assignee keyframe positioned outside of a range specified by the range parameter is assigned a weight of zero.

5. The computer readable medium of claim 4, wherein the weight assigned to the assignee keyframe is a function of a variable W, and W is equal to one minus a difference divided by the range parameter, and the difference is measured between a time value of the assignee keyframe and a time value of the selected keyframe.

6. The computer readable medium of claim 1, wherein the weight assigned to the assignee keyframe is further dependent on a falloff parameter.

7. The computer readable medium of claim 1, further comprising the step of deleting the assignee keyframe when a first distance divided by a second distance is less than zero, the first distance is measured between the time value of the assignee keyframe and a time value of another assignee keyframe before the step of modifying the time value of the assignee keyframe and the second distance is measured between the time value of the assignee keyframe and the time value of the other assignee keyframe after the step of modifying the time value of the assignee keyframe.

8. A method of processing image data to produce a modified keyframe value, comprising:
    selecting a keyframe from animation data including keyframes to produce a selected keyframe;
    assigning a weight to an assignee keyframe included in the animation data, the weight dependent on a distance measured in time between the selected keyframe and the assignee keyframe, wherein the weight assigned to the assignee keyframe is inversely proportional to the distance measured in time between the selected keyframe and the assignee keyframe;
    receiving input data indicating a change in a time value of the selected keyframe; and
    modifying a time value of the assignee keyframe by an amount based on the change in the time value of the selected keyframe and the weight assigned to the assignee keyframe to produce a changed time value.

9. The method of claim 8, wherein the input data indicates a change in an animation value of the selected keyframe.

10. The method of claim 9, further comprising the step of modifying an animation value of the assignee keyframe by an amount based on the change in the animation value of the selected keyframe and the weight assigned to the assignee keyframe to produce a changed animation value.

11. The method of claim 8, wherein the weight assigned to the assignee keyframe is further dependent on a range parameter and any assignee keyframe positioned outside of a range specified by the range parameter is assigned a weight of zero.

12. The method of claim 11, wherein the weight assigned to the assignee keyframe is a function of a variable W, and W is equal to one minus a difference divided by the range parameter, and the difference is measured between a time value of the assignee keyframe and a time value of the selected keyframe.

13. The method of claim 8, wherein the weight assigned to the assignee keyframe is further dependent on a falloff parameter.

14. A system for processing image data to produce a modified keyframe value, the system comprising:
    means for selecting a keyframe from animation data including keyframes to produce a selected keyframe;

means for receiving a input data specifying a change to a time value of the selected keyframe;

means for assigning a weight to an assignee keyframe included in the animation data, the weight dependent on a distance measured in time between the selected keyframe and the assignee keyframe, wherein the weight assigned to the assignee keyframe is inversely proportional to the distance measured in time between the selected keyframe and the assignee keyframe;

means for adjusting the first handle and the second handle based on the modification to produce a modified first handle and a modified second handle; and means for modifying a time value of the assignee keyframe by an amount based on the change in the time value of the selected keyframe and the weight assigned to the assignee keyframe.

15. The system of claim 14, further comprising means for modifying an animation value of the assignee keyframe by an amount based on the weight assigned to the assignee keyframe and a change in the animation value of the selected keyframe, the amount specified by the input data.

16. The system of claim 14, wherein the weight assigned to the assignee keyframe is further dependent on a range parameter and any assignee keyframe positioned outside of a range specified by the range parameter is assigned a weight of zero.

17. The method of claim 14, wherein the weight assigned to the assignee keyframe is further dependent on a falloff parameter.

* * * * *